United States Patent
Shen et al.

(10) Patent No.: US 10,274,916 B2
(45) Date of Patent: Apr. 30, 2019

(54) SYSTEM FOR OPTIMISING WORKFLOW FOR EFFICIENT ON-SITE DATA COLLECTION AND DETERMINATION OF ENERGY ANALYSIS AND METHOD OF OPERATION THEREOF

(71) Applicant: SIGNIFY HOLDING B.V., Eindhoven (NL)

(72) Inventors: Eric Bertrand Shen, Croton-On-Hudson, NY (US); Saeed Reza Bagheri, Croton-On-Hudson, NY (US); Sirisha Rangavajhala, White Plains, NY (US); Ermin Wei, Cambridge, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 195 days.

(21) Appl. No.: 15/024,013

(22) PCT Filed: Sep. 23, 2014

(86) PCT No.: PCT/IB2014/064758
§ 371 (c)(1),
(2) Date: Mar. 22, 2016

(87) PCT Pub. No.: WO2015/044860
PCT Pub. Date: Apr. 2, 2015

(65) Prior Publication Data
US 2016/0246271 A1  Aug. 25, 2016

Related U.S. Application Data

(60) Provisional application No. 61/881,596, filed on Sep. 24, 2013.

(51) Int. Cl.
*G05B 19/042* (2006.01)
*G06F 17/30* (2006.01)
(Continued)

(52) U.S. Cl.
CPC ............ *G05B 19/042* (2013.01); *G06F 8/38* (2013.01); *G06F 17/3053* (2013.01);
(Continued)

(58) Field of Classification Search
CPC .................. A24C 1/08; G05B 19/042; G05B 2219/2639; G06F 17/3053; G06F 8/38;
(Continued)

(56) References Cited

U.S. PATENT DOCUMENTS 6,996,508 B1 * 2/2006 Culp ................... G05B 15/02
700/291
8,996,538 B1 * 3/2015 Cremer ............ G06F 17/30864
707/749

(Continued)

OTHER PUBLICATIONS

Fielding Data Labs—Inventory & Auditing Software / OptoMizer Lighting Audit Retrofit Software http://www.fdlabs.com/products/optomizer.html.
(Continued)

*Primary Examiner* — Kenneth M Lo
*Assistant Examiner* — Chad G Erdman

(57) ABSTRACT

An energy audit system (1400), including at least one controller (1410) which may obtain attribute information (AI) for an energy consuming space, the AI including information related to a plurality of attributes and corresponding attribute choice information for each of the plurality of attributes; determine dependencies of each of the plurality of attributes; determine a ranking of each of the attributes based upon a dependency score of each of the attributes; determine an optimized workflow based upon the ranking of each of the attributes; and/or renders a user interface (UI) in accordance with the optimized workflow.

11 Claims, 13 Drawing Sheets

(51) Int. Cl.
 *G06F 8/38* (2018.01)
 *G06Q 10/06* (2012.01)
(52) U.S. Cl.
 CPC ....... *G06Q 10/063* (2013.01); *G06Q 10/0633* (2013.01); *G05B 2219/2639* (2013.01); *Y02P 90/82* (2015.11); *Y04S 10/54* (2013.01)
(58) Field of Classification Search
 CPC .... G06Q 10/063; G06Q 10/0633; Y02P 90/82
 See application file for complete search history.

(56) References Cited

U.S. PATENT DOCUMENTS

| | | | | |
|---|---|---|---|---|
| 9,753,925 | B2* | 9/2017 | Cremer | G06F 17/30044 |
| 2011/0109301 | A1* | 5/2011 | Johnson | H01R 13/6633 |
| | | | | 324/119 |
| 2011/0265020 | A1 | 10/2011 | Fields et al. | |
| 2012/0191392 | A1* | 7/2012 | Liang | G06F 17/5045 |
| | | | | 702/65 |
| 2012/0206051 | A1* | 8/2012 | Nieuwlands | H05B 37/0227 |
| | | | | 315/153 |
| 2012/0216123 | A1 | 8/2012 | Shklovskii et al. | |
| 2013/0050511 | A1 | 2/2013 | Derby et al. | |
| 2013/0325606 | A1* | 12/2013 | Balduf | G06Q 30/02 |
| | | | | 705/14.53 |
| 2014/0379156 | A1* | 12/2014 | Kamel | G05F 1/66 |
| | | | | 700/291 |
| 2015/0019275 | A1* | 1/2015 | Koch | G06Q 10/0631 |
| | | | | 705/7.12 |
| 2015/0234833 | A1* | 8/2015 | Cremer | G06F 17/3053 |
| | | | | 707/626 |
| 2016/0079756 | A1* | 3/2016 | Ikeyama | G06Q 50/04 |
| | | | | 700/287 |

OTHER PUBLICATIONS

MARS / MARS : Mobile Assessment and Reporting System for PDA's, smart phones & tablets. http://www.web-labs.co.uk/Mars-PDS-reporting-software.html.

Natasa Djuric et al, "Optimization of energy consumption in buildings with hydronic heating systems considering thermal comfort by use of computer-based tools", Elsevier, Science Direct, Energy and Buildings 39, (2007) pp. 471-477.

Steffen Petersen et al, "Method for component-based economical optimisation for use in design of new low-energy buildings", Elsevier, Renewable Energy, 38, (2012) pp. 173-180.

Bryan Eisenhower et al, "A methodology for meta-model based optimization in building energy models", Elsevier, Energy and Buldings, 47, (2012) pp. 292-301.

Michael Deru et al, "Walmart Experimental Store Performance Stories", NREL, Conference Paper NREL-550-48295, Aug. 2010.

Anonymous: "Excel Dependent Dropdowns from a Sorted List". Jul. 29, 013, XP055160736, https://web.archive.org/web/20130729002108/http://www.contextures.com/xlDataVal13.html.

Econinsight audit tool: available through www.ecoinsight.com.

* cited by examiner

FIG. 1
(Prior Art)

Enter luminaire details

Luminaire information
Lamp type:
Fluorescent (linear)
Of lines:
1

Lamp information
Sub type:
T12
Bulb type:

Ballast information
Type:
Electromagnetic

Other details
Notes:

Clone from: Include cloneable only

LUMINAIRE TYPES

| 504A Commercial strip | 504B High bay | 504C Industrial strip | 504D Surface other |
| 504E Surface wall | 504F Troffer | 504G Vanity | 504H Wrap ceiling |
| 504I Wrap wall | 506 BACK | | |

Enter a value:

Per luminaire
1

Per luminaire
1

☐ Saving screenshot
Screen is being saved

SYSTEM FOR OPTIMISING WORKFLOW FOR EFFICIENT ON-SITE DATA COLLECTION AND DETERMINATION OF ENERGY ANALYSIS AND METHOD OF OPERATION THEREOF

CROSS-REFERENCE TO PRIOR APPLICATIONS

This application is the U.S. National Phase application under 35 U.S.C. § 371 of International Application No. PCT/IB2014/064758, filed on Sep. 23, 2014, which claims the benefit of Provisional Application No. 61/881,596, filed on Sep. 24, 2013. These applications are hereby incorporated by reference herein.

The present system relates to a system which can model energy conservation measures (ECMs) for a building and, more particularly, to a system which can optimize a collection workflow for efficient on-site data collection for modeling ECMs and a method of operation thereof.

Reducing energy consumption in buildings represents a major financial opportunity for businesses. The most effective energy retrofits in buildings from an energy and financial standpoint are lighting retrofits. One of the most critical steps in the process of providing energy retrofits is the on-site data collection (or audit). In this step, an auditor physically walks through the building, from room to room, and notes details about the room and the installed lighting. This process today is typically manually performed with pen and paper, and data collected during the audit must then be re-entered into a software program for further energy and/or financial analyses. Collecting data by pen and paper has the advantage of being relatively quick at first. However, the overall process is extremely time consuming and inefficient because the data has to then be entered into a computer so that it can be analyzed by, for example, analysis software. FIG. 1 shows a graph 100 illustrating a conventional paper audit. Conventional audits may be improved by using a mobile device during the audit to collect the data and then to automatically push the data to the analysis software for analysis (e.g., see, R1). This addresses the time required for the entry of data. However, collecting the data using conventional mobile device applications is in itself time-consuming, especially compared to using pen and paper. Therefore there is a need for a mobile device application that can collect data in an efficient manner.

FIG. 2 shows a screen shot 200 of a mobile application for performing lighting-based audits. Deficiencies of this mobile application are: (1) A large portion of the user interface uses small buttons that require precise touch. This is difficult when walking around with a mobile device. (2) The data collection for luminaires, lamps, and ballasts in this example is all combined into a single line entry for each data field. Each different luminaire type, lamp type, luminaire dimension, lamp power, etc. will require a separate line item. This results in potentially thousands of line items, requiring manual scrolling to find a desired line item from the thousands of line items. (3) Other mobile applications can collect each data field individually (as opposed to aggregating all data fields into a single line entry), but this requires many fields of manual data entry, either through small buttons and drop downs lists, or through manual entry using a soft keyboard or the like, which can be inconvenient and time consuming.

Moreover, although energy conservation measures may be calculated for known variables, they are typically not determined for uncertain variables such as fuel cost, weather, etc., which may change in the future. For example, energy performance of a building is closely related to the long term operating expense associated with it (see, R5). Several demonstrations, both in simulation (see, R2, R4) and in practice (R3), have established that one can optimize the energy use of a property through building construction/retrofitting projects. Conventional state-of-the-art methods either focus solely on minimizing energy consumption, while overlooking the financial incentives and occupant comfort, or aim at optimizing the energy related expenses under one particular deterministic setting while omitting stochastic risks, such as volatility in energy pricing, weather uncertainties, etc., in an operating environment of a building. Consequently, an owner of a building may not find a recommendation for energy saving measures (ECMs) for retrofitting a building (e.g., a construction/recommendation) to be profitable and/or relevant over its lifetime. Accordingly, as conventional systems which calculate ECS for a building may not correctly determine future risks and savings, owners and/or others associated with a building may not be willing to undertake projects to implement the ECMs.

The deficiencies of prior art methods call for an intelligent system for determining future costs and/or associated savings due to ECMs which can be implemented in a building. Accordingly, embodiments of the present system may provide for an intelligent energy retrofit risk management system that can receive fundamental stochastic and/or deterministic risk/reward factors. Stochastic risk factors refer to the uncertain elements which will affect energy performance and/or comfort of a retrofitted building. Examples include predicted occupancy schedule, future weather conditions, and future energy prices. Deterministic risk factors refer to the fundamental properties of a building which are known with certainty and (together with the stochastic risk factors) affect the overall performance of a retrofitted building. Examples of deterministic risk factors include physical building properties, lighting composition, and heating, ventilation and air-conditioning (HVAC) system parameters. Using both the stochastic and deterministic risk factors as inputs, an energy retrofit risk management system in accordance with embodiments of the present system can build a portfolio of scenarios along with their associated probabilistic view of total future value, which can then be used to optimize energy performance and occupant comfort (of the building) under uncertainty.

Due to the fluctuations in energy prices and the global warming effects as a result of pollution emission in the energy generation/conversion process, energy conservation has gained much attention recently. Buildings in the United States consume a significant amount of energy. Thus undertaking a building retrofitting project, in which new energy efficient technologies and features are added to an existing building or other structure, can potentially yield both a promising return-on-investment (ROI) due to the future savings obtained by reducing energy consumption and can reduce the negative environmental impact due to reduction in greenhouse gas emission such as $CO$, emissions.

However, as discussed above, not all building owners are interested and/or motivated to retrofit existing buildings to control and/or optimize energy use. Two main obstacles to retrofitting existing buildings are: (1) a lack of clear and convincing financial and/or other incentives, and (2) the inability of existing models to capture uncertainty in the future—thereby yielding a retrofit solution that may not be optimal over its lifetime. Hence, to ensure the success of a building retrofit project, the owner of the building should be aware of potential risk and rewards due to uncertain future energy costs.

The system(s), device(s), method(s), user interface(s), computer program(s), processes, etc. (hereinafter each of which will be referred to as system or the system, unless the context indicates otherwise) described herein address problems in prior art systems. Embodiments of the present system may detect energy use, predict energy use of a structure such as a building (hereinafter each of which will be commonly referred to as building for the sake of simplicity).

Embodiments of the present system may employ an application configured for use on a mobile device (MD) such as a smart phone, a tablet, etc., and may be operative to collect data during a lighting-based audit. Embodiments of the present system may optimize workflow so as to efficiently collect data of the lighting-based audit. The efficiency of data collection may be achieved through, for example, methods which employ: 1) a hierarchical data collection structure to reduce manual data entry and/or user selections, and 2) a user interface (UI) that optimizes the efficiency and/or convenience of the interaction between a user such as an auditor and the MD.

In accordance with embodiments of the present system, there is disclosed an energy audit system (1400), including at least one controller (1410) which may obtain attribute information (AI) for an energy consuming space, the AI including information related to a plurality of attributes and corresponding attribute choice information for each of the plurality of attributes; determine dependencies of each of the plurality of attributes; determine a ranking of each of the attributes based upon a dependency score of each of the attributes; determine an optimized workflow based upon the ranking of each of the attributes; and/or renders a user interface (UI) in accordance with the optimized workflow.

It is also envisioned that the controller may further obtain attribute choice information selected by a user and which corresponds to at least one of the plurality of attributes. Moreover, the controller may further determine the dependencies of each of the plurality of attributes based upon a dependency matrix. Further, the controller may determine the ranking based upon the determined dependencies of each of the plurality of attributes. It is also envisioned that the controller may determine whether an attribute of the plurality of attributes is a dependent attribute based upon the ranking of each of the plurality of attributes. It is further envisioned that the controller may automatically populate attribute choice information corresponding to at least one of the plurality of attributes that is determined to be a dependent attribute.

In accordance with yet other embodiments of the present system, there is provided a method of generating an energy audit, the method may be performed by at least one controller and may include one or more acts of acts of: obtaining attribute information (AI) for an energy consuming space the AI including information related to a plurality of attributes and corresponding attribute choice information for each of the plurality of attributes; determining dependencies of each of the plurality of attributes; determining a ranking of each of the attributes based upon a dependency score of each of the attributes; determining an optimized workflow based upon the ranking of each of the attributes; and rendering a user interface (UI) in accordance with the optimized workflow.

It is also envisioned that the method may further include an act of obtaining attribute choice information selected by a user and which may correspond to at least one of the plurality of attributes. Moreover, the method may include an act of determining the dependencies of each of the plurality of attributes based upon a dependency matrix. Further, the method may include an act of determining the ranking based upon the determined dependencies of each of the plurality of attributes. It is also envisioned that the method may include an act of determining whether an attribute of the plurality of attributes is a dependent attribute based upon the ranking of each of the plurality of attributes. It is also envisioned that the method may include an act of automatically populating attribute choice information corresponding to at least one of the plurality of attributes that is determined to be a dependent attribute.

In accordance with yet further embodiments of the present system, there is disclosed a computer program stored on a computer readable memory medium, the computer program configured to generate information indicative of an energy audit for a space, the computer program may include a program portion which may be configured to: obtain attribute information (AI) for an energy consuming space the AI including information related to a plurality of attributes and corresponding attribute choice information for each of the plurality of attributes; determine dependencies of each of the plurality of attributes; determine a ranking of each of the attributes based upon a dependency score of each of the attributes; determine an optimized workflow based upon the ranking of each of the attributes; and/or render a user interface (UI) in accordance with the optimized workflow on a display of the system.

It is also envisioned that the program portion may be further configured to obtain attribute choice information selected by a user and which corresponds to at least one of the plurality of attributes. Further, the program portion may be further configured to determine the dependencies of each of the plurality of attributes based upon a dependency matrix. Moreover, the program portion may be further configured to determine the ranking based upon the determined dependencies of each of the plurality of attributes. It is also envisioned that the program portion may be further configured to determine whether an attribute of the plurality of attributes is a dependent attribute based upon the ranking of each of the plurality of attributes. It is also envisioned that the program portion may be further configured to automatically populate attribute choice information corresponding to at least one of the plurality of attributes that is determined to be a dependent attribute.

The invention is explained in further detail, and by way of example, with reference to the accompanying drawings wherein:

Figure 1:
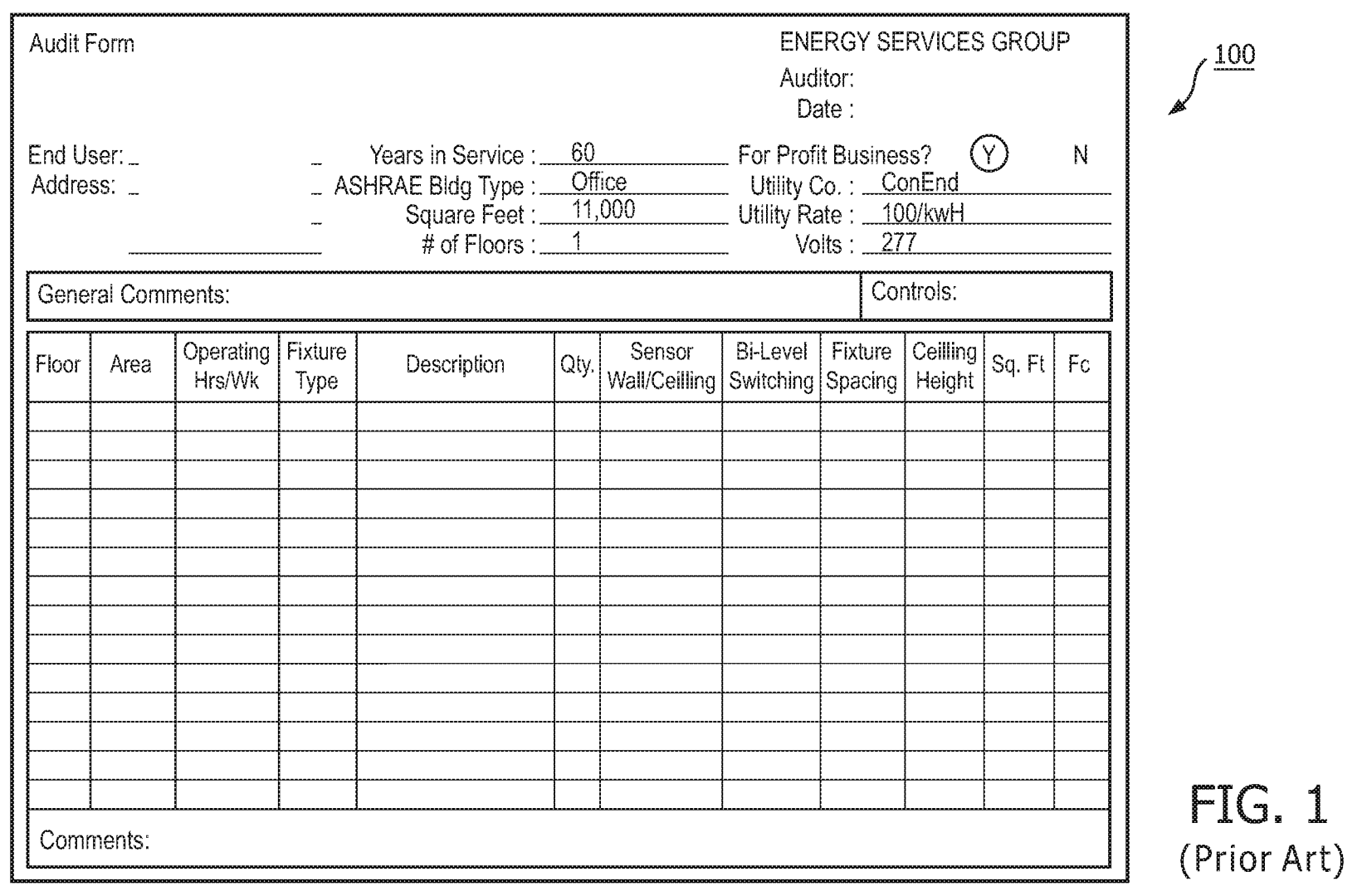

FIG. 1 shows a graph illustrating a conventional paper audit;

FIG. 5 shows a screen shot of an optimized workflow implemented on a mobile device in accordance with embodiments of the present system;

FIG. 6 shows a screen shot of an optimized workflow implemented on a mobile device in accordance with embodiments of the present system;

FIG. 7 shows a screen shot of an optimized workflow implemented on a mobile device in accordance with embodiments of the present system;

FIG. 8 shows a screen shot of a populated menu formed using an optimized workflow implemented on a mobile device in accordance with embodiments of the present system;

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the entire scope of the present system. In the accompanying drawings, like reference numbers in different drawings may designate similar elements.

Figure 2:
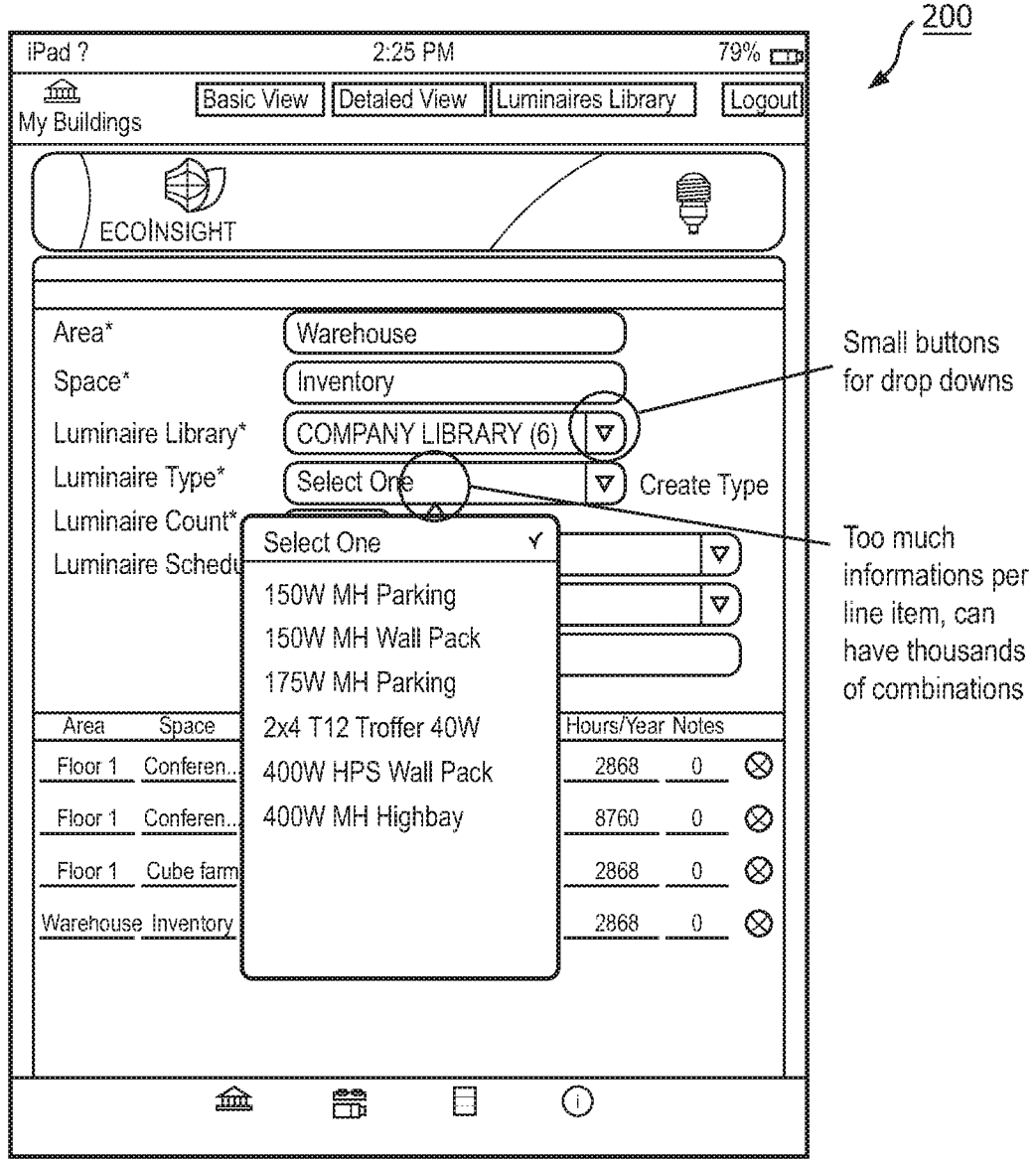
FIG. 2 shows a screen shot of a mobile application for performing lighting-based audits.
Figure 3:
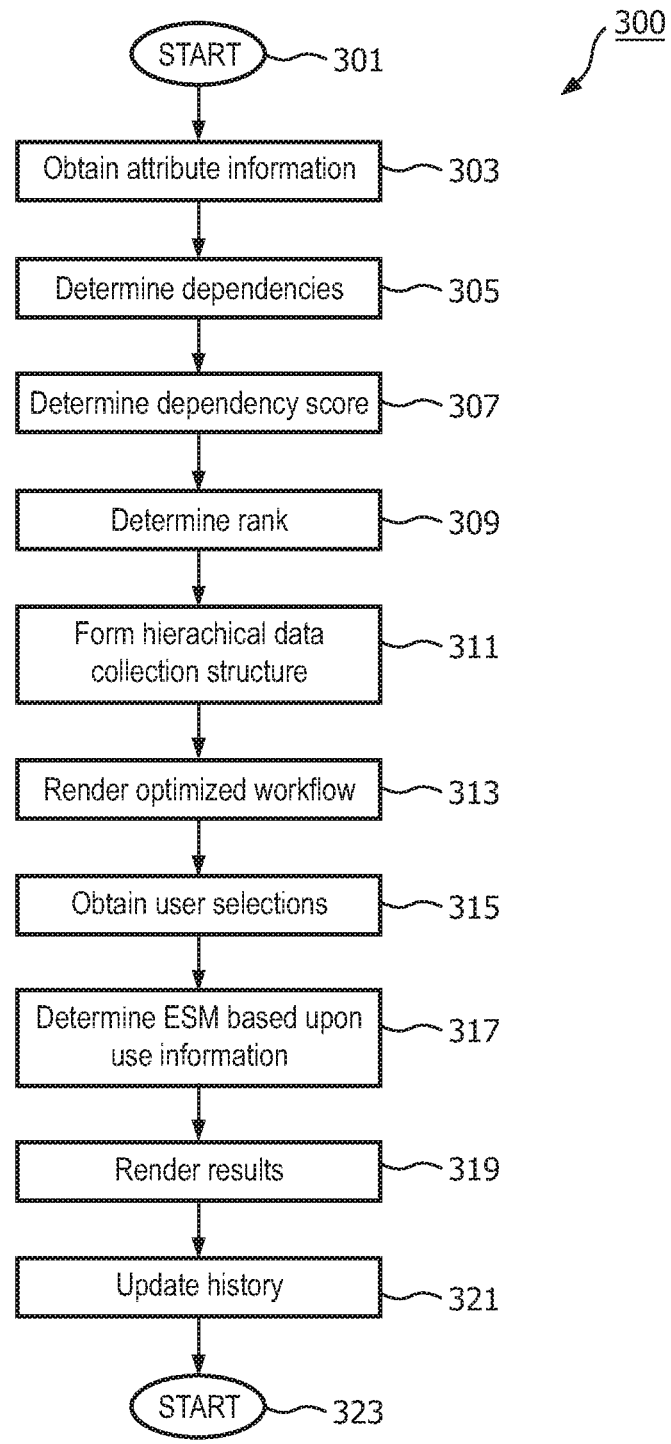
FIG. 3 shows a flow diagram that illustrates a process performed by an energy analysis system in accordance with embodiments of the present system.

FIG. 3 shows a flow diagram that illustrates a process 300 performed by an energy analysis system in accordance with embodiments of the present system. The process may determine a workflow that may be used to acquire building information (BI) for a space. The space may include any space which may consume energy such as a space in a building (e.g., a room, a hallway, a storage area, etc), a structure, a stadium, an outdoor area (e.g., a park, a street, a walkway, a highway, a road, etc.). Further, for the sake of simplicity of the present description, the term building may refer to a building, a structure, a stadium, an outdoor area (e.g., a park, a street, a walkway, a highway, a road, etc.), or any other area in which the present system may be suitably employed. The building information (BI) may be used to determine the use and/or energy consumption for a space of the building so as to predict energy conservation measures (ECMs) in accordance with embodiments of the present system. The process 300 may be performed using one or more computers communicating over a network and may obtain information and/or store information using one or more memories which may be local and/or remote from each other. The process 300 can include one of more of the following acts. Further, one or more of these acts may be combined and/or separated into sub-acts, if desired. Further, one or more of the acts of the process 300 may be performed sequentially or in parallel with one or more other acts of the process 300. In operation, the process may start during act 301 and then proceed to act 303.

During act 303, the process may obtain attribute information (AI). The attribute information and may include a plurality of attributes. For example, for a given list of n attributes, the attributes may be represented as $a_1$ through $a_n$ ($a_1$-$a_n$) and may be formed in vector form (e.g., row and/or column vector form), if desired. In the present example, it will be assumed that the attribute information (AI) is obtained from a memory of the system and may include a default setting such as shown in Table 3 below.

In accordance with embodiments of the present system, this act may be performed once to initialize embodiments of the present system and results may be stored in a memory of the system for later use. For example, this act may be performed to obtain data that may be used to structure the data collection as efficiently as possible for a specific application (e.g., across different buildings that are of the same survey type such as hospital buildings, etc. and users of this process may not have to repeat this act). For another application (e.g., a building of a different survey type such as an office building, etc. instead of the hospital discussed above), this act may be performed initially or repeatedly for each different survey type or as desired. After completing act 303, the process may continue to act 305.

During act 305, the process may determine dependencies for each of the attributes $a_1$-$a_n$. The process may perform this act by, for example, constructing a dependency matrix D where each row and column corresponds to an attribute. Thus the dependency matrix (D) is of dimension n×n and may be represented as:

$$D = \begin{matrix} & \begin{matrix} a_1 & \cdots & a_n \end{matrix} \\ \begin{matrix} a_1 \\ \vdots \\ a_n \end{matrix} & \begin{bmatrix} \cdots & & \\ \vdots & \ddots & \vdots \\ \cdots & & \end{bmatrix} \end{matrix}$$

Each row of D is then a row vector indicating dependencies for the attribute corresponding to that row. For a simple example, given three attributes $a_1, a_2, a_3$;

$$D = \begin{bmatrix} 0 & 1 & 1 \\ 0 & 1 & 0 \\ 1 & 1 & 1 \end{bmatrix}$$

The first row of D may indicate the dependencies for $a_1$ (where a dependency is only indicated by a 1 (as opposed to a 0)) the second row of D may indicate the dependencies for $a_2$; and the third row of D may indicate the dependencies for $a_2$. For this example then, the dependencies may be represented as shown in Table 1 below.

TABLE 1

| Attribute | Dependencies |
|---|---|
| $a_1$ | $a_2, a_3$ |
| $a_2$ | $a_2$ |
| $a_3$ | $a_1, a_2, a_3$ |

For example, for four attributes: 1) Luminaire Lamp Type, 2) Luminaire Type, 3) Luminaire Dimensions, and 4) Lamp Subtype, Luminaire Lamp Type has the highest dependency score since the highest number of attributes have a dependency on the Luminaire Lamp Type (e.g., see Table 4 below). In this way, the choice of Luminaire Lamp Type (e.g., linear fluorescent vs. incandescent) may be used to determine what possible Luminaire Types are applicable, which in turn may be used to determine what Luminaire Dimensions are applicable, which in turn determines what Lamp Subtypes may be applicable. After completing act 305, the process may continue to act 307.

During act 307, the process may determine a dependency score (S) for each attribute $a_1$-$a_n$ (e.g., $a_1, a_2, a_3$, in the present example) as a linear combination (summation) of the dependencies. Thus a summation of the elements in each column of D will give a dependency score for each attribute $a_1$-$a_n$.

A vector of dependency scores $\vec{S}$ (i.e., a dependency score vector) may be calculated as a linear combination (summation) of the columns in D. For a simple summation, D is multiplied by a row vector $\vec{r}$ of ones of dimension n.

$$\vec{S} = \vec{r} \cdot D$$

Continuing the above-described example, then, $$\vec{S} = [1 \; 1 \; 1] \begin{bmatrix} 0 & 1 & 1 \\ 0 & 1 & 0 \\ 1 & 1 & 1 \end{bmatrix},$$

and $$\vec{S} = [1 \; 3 \; 2]$$

Thus, the dependency score for each of the attribute $a_1$-$a_n$ (e.g., $a_1, a_2, a_3$, in the present example) may be represented as shown in Table 2 below.

TABLE 2

| Attribute | Dependency Score |
|---|---|
| $a_1$ | 1 |
| $a_2$ | 3 |
| $a_3$ | 2 |

After completing act 307, the process may continue to act 309.

During act 309, the process may determine a ranking for each of the attributes $a_1$-$a_n$ (e.g., $a_1, a_2, a_3$, in the present example) based upon the corresponding attributes dependency score. Thus, the process may rank attributes with the highest determined dependency scores highest; and attributes with the lowest determined dependency scores lowest. However, in yet other embodiments, it is envisioned that the process may rank attributes with the highest determined dependency scores lowest and attributes with the lowest determined dependency scores highest, if desired. After completing act 309, the process may continue to act 311.

During act 311, the process may form a hierarchical data collection structure in accordance with a ranking of each of the attributes. For example, the highest ranking attributes may be positioned highest in the hierarchical data collection structure and lowest ranking attributes may be positioned lowest in the hierarchical data collection structure. Thus, the process may form a data collection structure based upon the ranking (score) of one or more corresponding attributes. The hierarchical data collection structure may be considered an optimized workflow. The process may further compare the ranking of each of the attributes with a threshold value, and if it is determined that ranking of an attribute of the attributes is greater than or equal to the threshold value, the process may position the attribute as discussed above in the hierarchical data collection structure. However, if it is determined that ranking of the attribute is less than the threshold value, the process may select a default value (e.g., 0) for the attribute. After completing act 311, the process may continue to act 313.

During act 313, the process may render the optimized workflow on a user interface (UI) of the system such as on a display of a device. The optimized workflow may include one or more menus generated by the system which may include menu items for selection by the user. The menu items may include, for example, attributes and one or more corresponding choices which may be selected by the user. After completing act 313, the process may continue to act 315.

During act 315, the process may obtain selections of the attribute choices selected by, for example, the user. Accordingly, the process may monitor selection by a user (e.g., user selection) of the menu items corresponding to the attribute choices. After completing act 315, the process may continue to act 317.

During act 317, the process may determine one or more energy savings measures (ESMs) based upon the selection of the attribute choices by the user. The ESMs may be determined for example, by the process using any suitable application or applications.

For example, in accordance with embodiments of the present system, ESMs may be related to lighting, so lighting retrofits (e.g., energy efficient lighting replacements), and controls (e.g., occupancy-based switching, daylight dimming) may be used. The ESMs may be determined automatically or by a user (e.g., a salesperson) with sufficient knowledge/skills. This user may assess a current situation of energy use by examining the data collected as a result of the building audit, and then recommend, for example, energy saving measures such as a lamp replacement, or controls, etc. based on the expertise of the user, in order to conserve energy while providing an enhanced visual environment due to installed energy savings measures (e.g., light dimming, lamp type, etc.). Data collected by embodiments of the present system (e.g., an audit tool may also be used for an energy retrofit risk management system that may further analyze ESMs. In yet further embodiments, a computer or tablet-based tool may use the audit data in order to select and recommend appropriate ESMs. After completing act 317, the process may continue to act 319.

During act 319, the process may render results of the process such as the ESMs on a UI of the system such as a display for the convenience of the user. The UI may further include one or more selections and/or parameters which may be selected and/or changed by the user so that a user may fine tune results of the process, if desired. For example, the user may modify one of the choices (e.g., see, act 313) and the process may update the ESMs in real time in accordance with the user's modification. After completing act 319, the process may continue to act 321.

During act 321, the process may form and/or update history information in accordance with results of the process and/or any user selections (e.g., during act 315). The history information may be stored in a memory of the system for later use. After completing act 321, the process may continue to act 323, where it ends.

EXAMPLE

The above-described process will now be described with reference to an example where n=12. Further, because it is assumed that about 90% of all lighting retrofits involve linear fluorescent lamps, the detailed description described here will focus on linear fluorescent lamps. The following attributes and corresponding choices will be assumed as listed in Table 3 below.

TABLE 3

| No. | Attribute | (ATTRIBUTE) Choice(s) |
|---|---|---|
| 1 | Luminaire Lamp Type | Fluorescent, CFL, HID |
| 2 | Luminaire Type | Troffer, Strip |
| 3 | Luminaire Dimensions | 1 × 4, 2 × 2 |
| 4 | Number of Luminaires | User Input |
| 5 | Lamp Subtype | T12, T8 |
| 6 | Lamp Wattage | 32 W, 28 W |
| 7 | Lamp Color Temperature | 3000 K, 4500 K |
| 8 | Number of Lamps Per Luminaire | 2, 3, 4 |
| 9 | Ballast Type | Electromagnetic, Electronic |
| 10 | Ballast Factor | Low, Normal, High |
| 11 | Ballast Input Voltage | 120 V, 277 V |
| 12 | Number of Ballasts Per Luminaire | 1, 2 |

As n=12, there are a total of twelve attributes. Accordingly, the process may form a dependency matrix (D) as follows:

$$D = \begin{bmatrix} 0 & 0 & 0 & 0 & 0 & 0 & 0 & 0 & 0 & 0 & 0 & 0 \\ 1 & 0 & 0 & 0 & 0 & 0 & 0 & 0 & 0 & 0 & 0 & 0 \\ 1 & 1 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 1 & 1 & 1 & 0 & 1 & 0 & 0 & 0 & 0 & 0 & 0 & 0 \\ 0 & 0 & 0 & 0 & 0 & 0 & 0 & 0 & 0 & 0 & 0 & 0 \\ 0 & 1 & 1 & 0 & 0 & 0 & 0 & 0 & 0 & 0 & 0 & 0 \\ 1 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 1 & 0 & 0 & 0 & 1 & 0 & 0 & 0 & 0 \end{bmatrix}$$

Then, a vector of dependency scores $\vec{S}$ may be calculated as:

$$\vec{s} = [1\ 1\ 1\ 1\ 1\ 1\ 1\ 1\ 1\ 1\ 1\ 1]$$

$$\begin{bmatrix} 0 & 0 & 0 & 0 & 0 & 0 & 0 & 0 & 0 & 0 & 0 & 0 \\ 1 & 0 & 0 & 0 & 0 & 0 & 0 & 0 & 0 & 0 & 0 & 0 \\ 1 & 1 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 1 & 1 & 1 & 0 & 1 & 0 & 0 & 0 & 0 & 0 & 0 & 0 \\ 0 & 0 & 0 & 0 & 0 & 0 & 0 & 0 & 0 & 0 & 0 & 0 \\ 0 & 1 & 1 & 0 & 0 & 0 & 0 & 0 & 0 & 0 & 0 & 0 \\ 1 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 1 & 0 & 0 & 0 & 1 & 0 & 0 & 0 & 0 \end{bmatrix},$$

where, $$\vec{S} = [5\ 4\ 4\ 0\ 2\ 0\ 0\ 0\ 0\ 0\ 0]$$

Thus, the dependency score for each of the attributes $a_1$-$a_{12}$ may be represented as shown in Table 4 below. All other dependency scores lower than four may be set to a default value such as 0.

TABLE 4

| Attribute | Dependency Score | Rank |
|---|---|---|
| Luminaire Lamp Type | 5 | 1 |
| Luminaire Type | 4 | 2 |
| Luminaire Dimensions | 4 | 2 |
| Number of Luminaires | 0 | |
| Lamp Subtype | 2 | 3 |
| Lamp Wattage | 0 | |
| Lamp Color Temperature | 0 | |
| Number of Lamps Per Luminaire | 1 | 4 |
| Ballast Type | 0 | |
| Ballast Factor | 0 | |
| Ballast Input Voltage | 0 | |
| Number of Ballasts Per Luminaire | 0 | |

Thus the top four attributes by dependency score are: Luminaire Lamp Type, Luminaire Type, Luminaire Dimensions, and Lamp Subtype, respectively. Accordingly, these attributes are ranked in order from first through fourth as shown. Accordingly, the hierarchical data collection structure in accordance with embodiments of the present system may include these top four attributes by ranking. An interpretation of the hierarchy of each attribute and corresponding choices (e.g. for a user's selection) is listed in Table 5 below.

TABLE 5

| Rank | Attribute | Choices | Notes |
|---|---|---|---|
| 1 | Luminaire Lamp Type | e.g. Fluorescent Linear, Fluorescent Compact, HID, Incandescent, LED | The choice of Luminaire Lamp Type will determine the possible Luminaire Types. |
| 2 | Luminaire Type | e.g. for Fluorescent Linear, Commercial Strip, High Bay, Troffer, etc. | The choice of Luminaire Type will determine the possible Luminaire Dimensions |
| 3 | Luminaire Dimensions | e.g. for Troffer, 1 × 4, 2 × 2, 2 × 4, etc. | The choice of Luminaire Dimensions will determine the possible Lamp Subtypes |

TABLE 5-continued

| Rank | Attribute | Choices | Notes |
|---|---|---|---|
| 4 | Lamp Subtype | e.g.. for 1 × 4, T12, T8, T5, etc. | The choice of the Lamp Subtype will allow the rest of the data fields to be populated with common default values, as well as possible options. |
| | Luminaire Dimension | dep./see notes | The choice of Luminaire Dimension in combination with the choice of Lamp Subtype, will determine the possible options for Lamp Power. The Luminaire Dimension determines the lamp length, which in combination with the Lamp Subtype determines possible Lamp Power . . . e.g. a 1 × 4 Luminaire can accept a 4 ft T12 lamp, which can have a Standard power of 40 W or an energy saving power level of 34 W. 40 W can be presented as the default Lamp Power. |
| | Lamp color temperature | dep./see notes | Lamp color temperature is largely independent of all other parameters and can be set to a default value that is common. |
| | The Number of Lamps Per Luminaire | dep./see notes | The Number of Lamps Per Luminaire is determined by the Luminaire Dimensions . . . e.g. a 1 × 4 luminaire will accept 1, 2, 3, or 4 lamps, with 2 lamps being common. |
| | Ballast Type | dep./see notes | For Ballast Type, the choice of Electromagnetic, Electronic Instant Start, or Electronic Rapid Start can default based on choice of Luminaire Type and Lamp Subtype (e.g. T5 and T8 lamps should always have Electronic Ballasts, where Instant or Rapid start can be inferred from Luminaire Type, e.g. High Bay in warehouse applications are typically Instant Start). |
| | Ballast Factor | dep./see notes | The Ballast Factor can always default to Normal, and then be adjusted by a user such as an auditor if necessary to High or Low. |
| | Ballast Input Voltage | dep./see notes | The Ballast Input Voltage defaults to the project input voltage as entered in the application. |
| | Number of Ballasts Per Luminaire | dep./see notes | The Number of Ballasts Per Luminaire depends on the Luminaire Dimension and Number of Lamps Per Luminaire. In most cases a default value of one is sufficient |

Accordingly, the optimized workflow has four attribute selections: (1) Luminaire Lamp Type, (2) Luminaire Type, (3) Luminaire Dimension, and (4) Lamp Subtype, in order (e.g., by ranking) The choices selected by the user for these four attribute selections may then be used by the system to automatically determine choices for one or more of the other attributes (e.g., marked "dep" for dependent). Thus, based upon an entry of an attribute selection, further depent attribute selections may be provided. Thus, in accordance with embodiments of the present system a selection process may be performed using expert domain knowledge, for example designed into the system, which may make attribute selections based upon known attribute selections. For example, embodiments of the present system may use expect domain knowledge to determine that a Linear Fluorescent can have Luminaire Type Troffer, which, in turn, may have dimensions of 1×4, 2×2, etc. Thus, the process may automatically select known attribute selections (e.g., Luminaire Type Troffer) and may provide to a user a menu with (further) available attribute selections based upon previous attribute selections thereby greatly simplifying entry choices available for selection by a user.

The process may then render the optimized workflow on a user interface (UI) of the system such as a display. As only four attribute selections are selected from a total of 12 (e.g., n=12), a process of entering user selections is simplified. The process may form a menu including these four attribute selections and corresponding attribute choices. Thus, from a user interface (UI) perspective, the four attribute selections in the optimized workflow may be rendered using any suitable method such as graphics, and/or button-based menu-item inputs. Thus, a user such as an auditor may collect a majority of required information (e.g., for 12 attributes) using only four clicks for the luminaire/lamp/ballast in accordance with embodiments of the present system. The menu-item inputs of the present system have the following advantages: (a) The graphical input provides the user with a large selection area (e.g., menu items, check boxes, or buttons, etc.) to utilize when making a selection, which can eliminate user entry inefficiencies which may occur when using a small selection area (e.g., small menu items or buttons) which is difficult to select when in a mobile environment; (b) a menu-item (e.g., including graphics, buttons, etc.) based entry methods may enable faster identification by the user of the appropriate option compared to using a drop down list entry area; and (c) a hierarchical data collection structure in accordance with embodiments of the present system assures that the user is never presented with "too many" options at any one time.

Several screenshots illustrating operation of the above-described example with n=12 will now be described below with reference to FIGS. 4 to 8. FIGS. 4 through 8 are shown in an actual order generated by the system and correspond with the ranking of the attributes (e.g. by level starting at the first level). In accordance with embodiments of the present system, the highest ranked attribute is assigned to a first level screen (e.g., 402) and the next highest ranked attribute is assigned a second screen level (e.g., 502) However, other orders are also envisioned.

Figure 4:
FIG. 4 shows a screen shot of an optimized workflow implemented on a mobile device in accordance with embodiments of the present system.

FIG. 4 shows a screen shot 400 of an optimized workflow implemented on a mobile device in accordance with embodiments of the present system. The process may generate and/or display at least one menu such as menus 401, 402. Menus may be considered a first-order (or level) hierarchical data collection structure (e.g., corresponding with ranking) With regard to menu 402, this menu may correspond with the highest ranking attribute (e.g., see Table 5) and may include selection items 404A through 404E (generally 404-x) for each corresponding attribute choice. A back button 406 may be provided to return to a previous window, screen, etc., when selected. Menu 401 is an underlying menu that is populated using an optimized workflow implemented on a mobile device in accordance with embodiments of the present system.

FIG. 5 shows a screen shot 500 of an optimized workflow implemented on a mobile device in accordance with embodiments of the present system. The process may generate and/or display at least one menu such as menus 501, 502. Menu 502 may be considered a second-order hierarchical data collection structure (e.g., corresponding with ranking). With regard to menu 502, this menu may correspond with the second highest ranking attribute (e.g., see Table 5) and may include selection items 504A through 504I (generally 504-x) for each corresponding attribute choice. Selection of one or more of the selection items 504-x may be utilized to populate the menu 501 with information related to the Luminaire Details similarly as discussed with regard to the menu 401. A back button 506 may be provided to return to a previous window, screen, etc., when selected.

Figure 6:
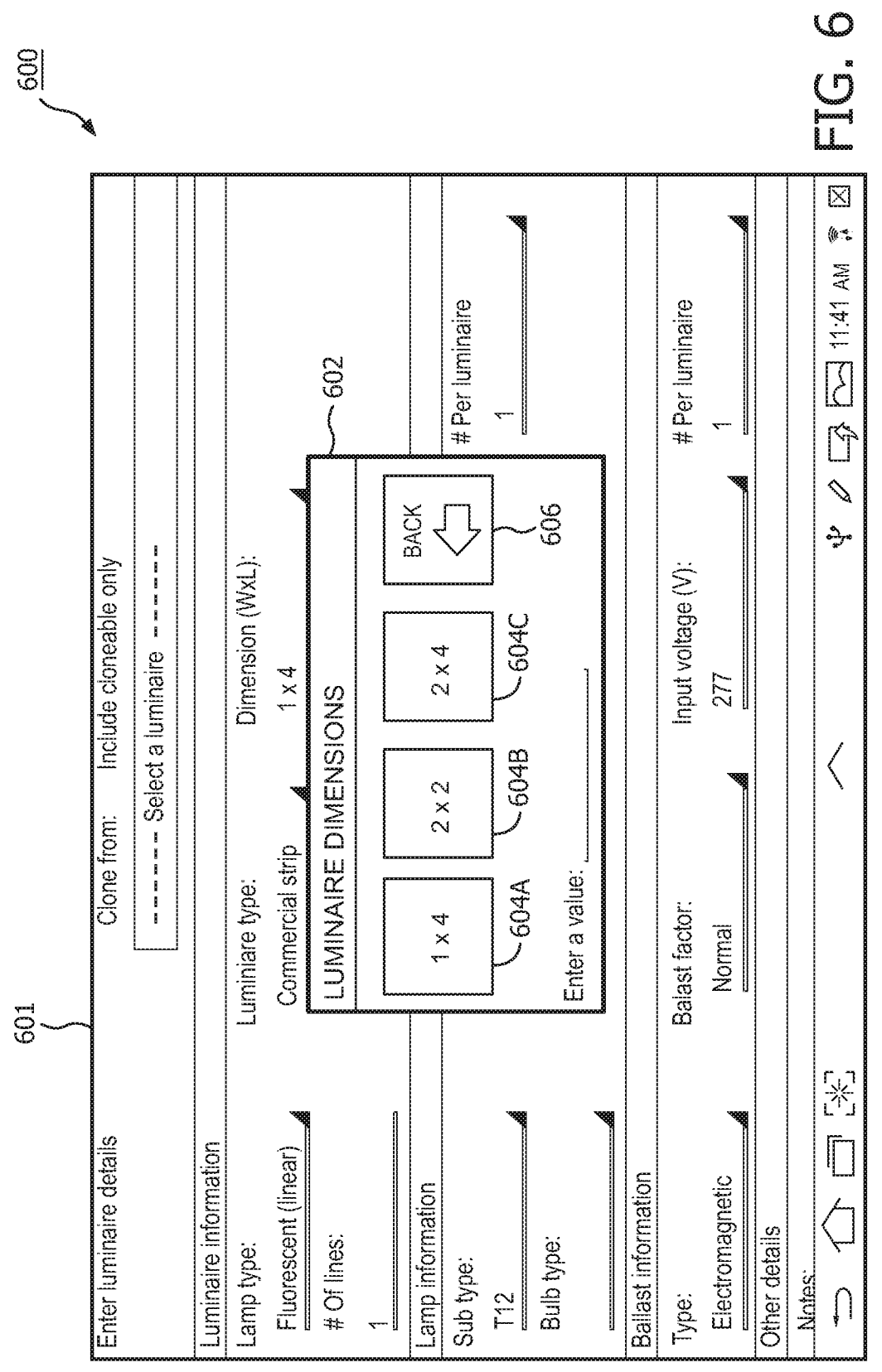

FIG. 6 shows a screen shot 600 of an optimized workflow implemented on a mobile device in accordance with embodiments of the present system. The process may generate and/or display least one menu such as menus 601, 602. Menu 602 may be considered a third-order (level) hierarchical data collection structure (e.g., corresponding with ranking) With regard to menu 602, this menu may correspond with the third highest ranking attribute (e.g., see Table 5) and may include selection items 604A through 604I (generally 604-x) for each corresponding attribute choice. Selection of one or more of the selection items 604-x may be utilized to populate the menu 601 with information related to the Luminaire Dimensions similarly as discussed with regard to the menu 401. A back button 606 may be provided to return to a previous window, screen, etc., when selected.

Figure 7:
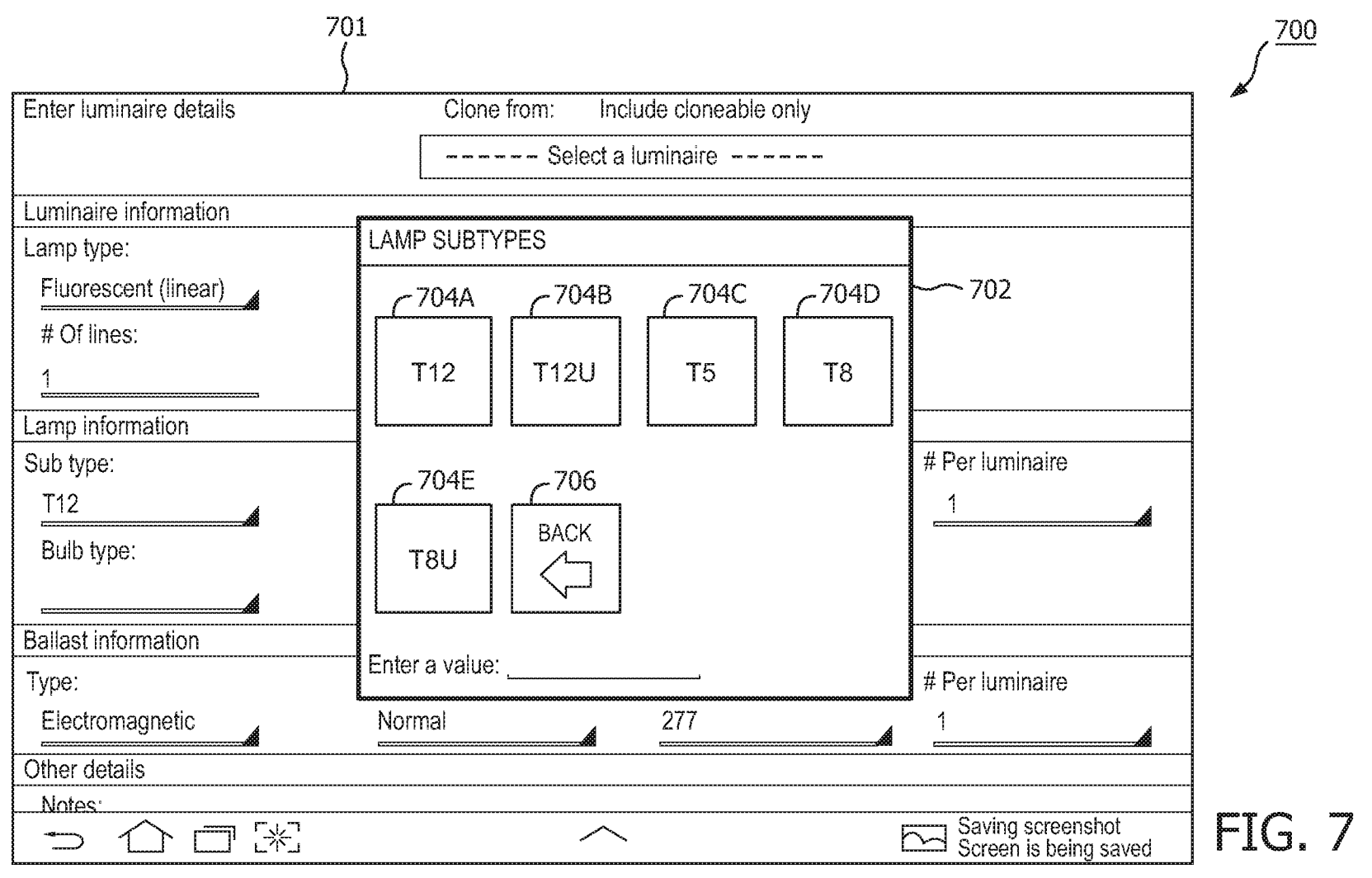

FIG. 7 shows a screen shot 700 of an optimized workflow implemented on a mobile device in accordance with embodiments of the present system. The process may generate and/or display least one menu such as menus 701, 702. Menu 702 may be considered a fourth-order (level) hierarchical data collection structure (e.g., corresponding with ranking) With regard to the menu 702, this menu may correspond with the fourth highest ranking attribute (e.g., Table 5) and may include a selection items 704A through 704I (generally 704-x) for each corresponding attribute choice. Selection of one or more of the selection items 704-x may be utilized to populate the menu 701 with information related to the Lamp Subtypes similarly as discussed with regard to the menu 401. A back button 706 may be provided to return to a previous window, screen, etc., when selected.

Figure 8:
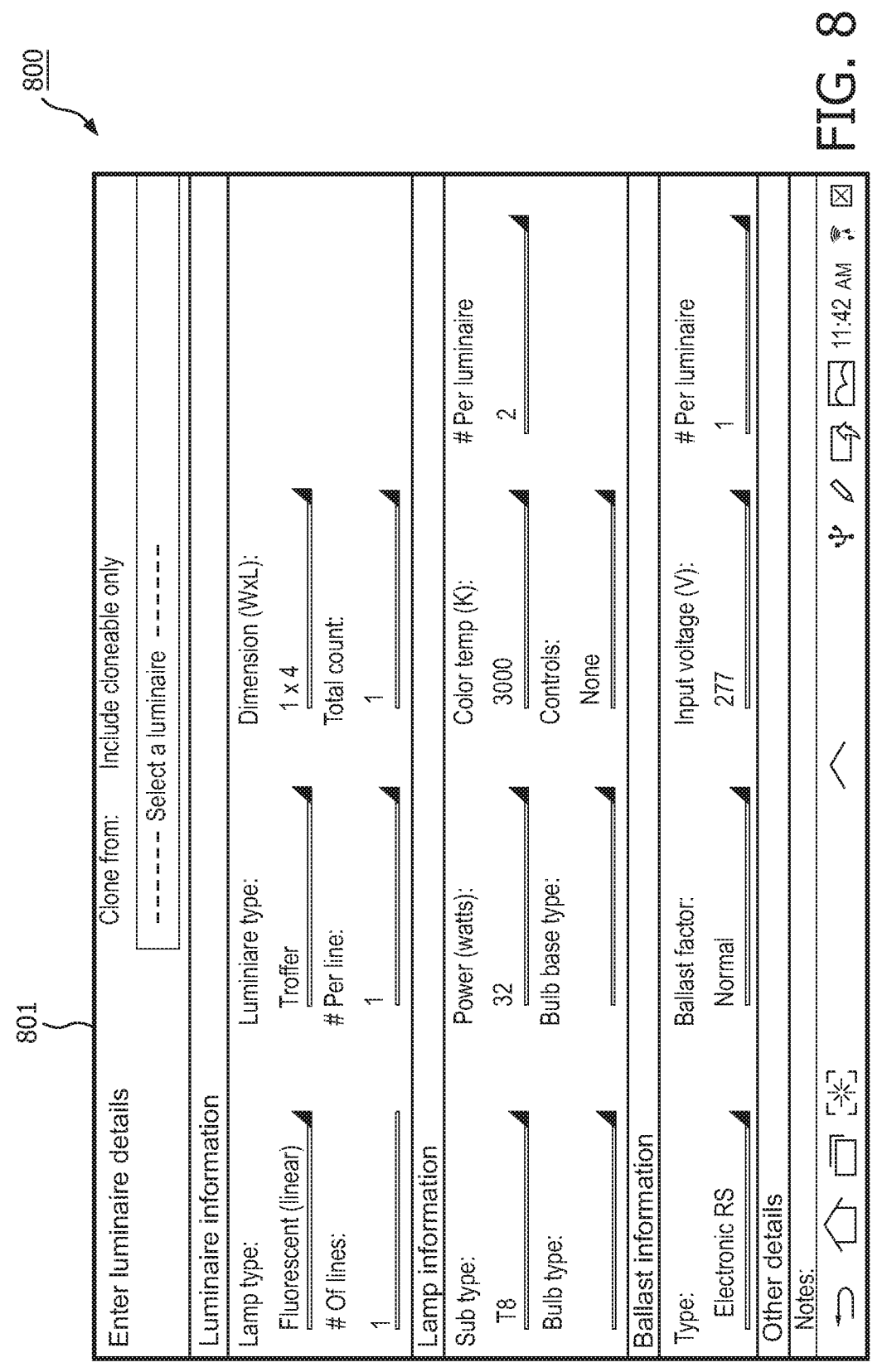

FIG. 8 shows a screen shot 800 of a populated menu 801 formed using an optimized workflow implemented on a mobile device in accordance with embodiments of the present system. The menu 801 is populated in accordance with selections entered using the workflow in accordance with embodiments of the present system for example through interaction with the menus 402, 502, 602, 702 as discussed above. In accordance with embodiments of the present system, the user may select attribute choices for the four highest-ranking attributes and the process may populate the attribute choices for the other eight attribute choices (for example of the twelve attribute choices in the current emboidments) in accordance with the user-entered selections. Some remaining attributes may have no dependencies based on previous selections, accordingly, these items may be left blank, or assigned (common) default values, as may be desired in accordance with system settings.

Thus, embodiments of the present system provide an optimized workflow for efficient on-site data collection without a need for manual entry of all of the data items. The optimized workflow may include a hierarchical data collection structure that may provide for algorithmic reduction of manual data entry. Further, the optimized workflow may provide for the reduction of subsequent choices presented to the user with each entry of data. Moreover, it is envisioned that the hierarchical data collection structure may be determined through a dependency scoring method. It is further envisioned that the dependency scoring may include a dependency matrix whereby dependency scores may be calculated from a linear combination of the elements in each column of the dependency matrix. It is also envisioned that the attributes with highest dependency scores may be assigned to the top of the hierarchical data collection structure. Further, in accordance with embodiments of the present system, the optimized workflow may provide for a user interface (UI) that may optimize an interaction between a user (e.g., an energy auditor) and the MD. It is also envisioned that the optimized workflow in accordance with embodiments of the present system may reduce a number of variables (e.g., attributes and/or choices) to be presented to, and/or selected by, the user, thus enabling an efficient user interface (UI). It is also envisioned that the UI may include a large graphical type menu including large menu selection items which do not require precise user movement for selection.

Uncertainties and ECMs

In accordance with yet other embodiments of the present system, an energy retrofit system including a risk management engine (RME) that receives fundamental stochastic and/or deterministic risk and/or reward factors as inputs may be utilized. Then, using these inputs, the RME may build one or more energy use models along with their associated probabilistic total future costs/value. For example, a relationship between the consumption of energy (e.g., of a selected fuel such as electricity, fuel oil, natural gas, steam, etc.), a human comfort level, and/or various retrofitting parameters (e.g., focusing on lighting renovation, HVAC tuning, etc.) based upon one or more of weather and/or energy price (e.g., for one or more selected sources) uncertainties may be determined. Specifically, the RME may employ stochastic models which employ retrofitting parameters to predict key building performance metrics, examples of which may include energy consumption (e.g., electricity consumption, natural gas consumption, etc.) and/or expected occupant comfort. The RME may optimize over retrofitting parameters with respect to the various stochastic risk factors (e.g., energy price and/or future weather) which may be uncertain. The RME may output a list of retrofit recommendations (e.g., a list of energy conservation measures (ECMs)), such as lighting and HVAC recommendations, which enhance one or more of net present value, occupant comfort level, etc. These ECMs may be more robust to future uncertainties such as energy and/or weather uncertainties than ECMs produced by conventional methods. Moreover, the RME may be applied to different categories of buildings (e.g., offices, hospitals, factories, warehouses, and schools) as may be desired.

Figure 9:
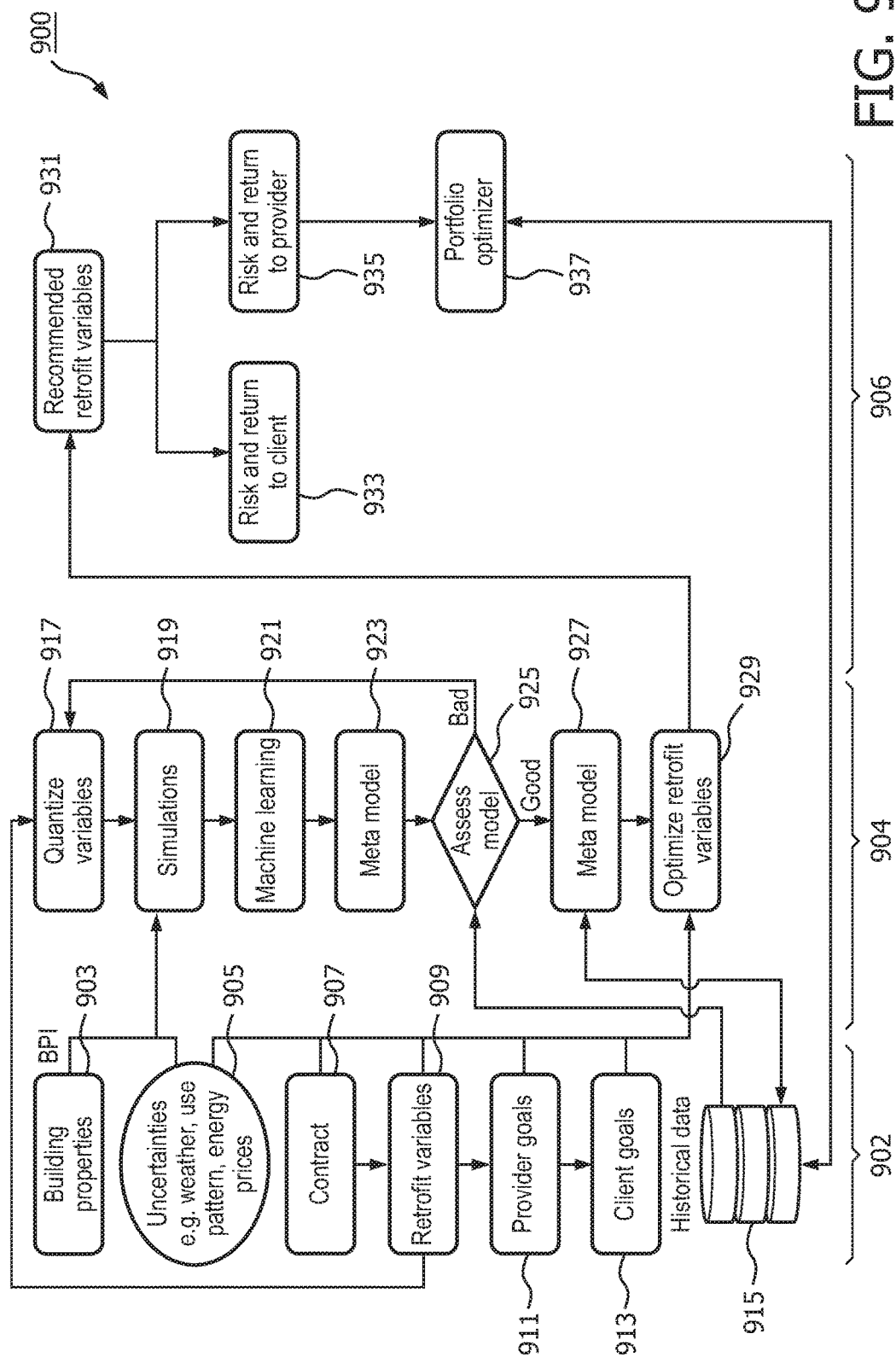
FIG. 9 shows a flow diagram that illustrates a process performed by an energy analysis system including a risk management engine (RME) in accordance with embodiments of the present system.

FIG. 9 shows a flow diagram that illustrates a process 900 performed by an energy analysis system including an RME in accordance with embodiments of the present system. The process may determine a workflow that may be used to acquire building information (BI) for one of more spaces of a building. The building information may be used to determine the use and/or energy consumption for the space so as to assist in selecting energy conservation measures (ECMs) in accordance with embodiments of the present system. The process 900 may be performed using one or more computers communicating over a network and may obtain information and/or store information using one or more memories which may be local and/or remote from each other. The process 900 can include one of more of the following acts. Further, one or more of these acts may be combined and/or separated into sub-acts, if desired. Further, one or more of the acts of the process 900 may be performed sequentially or in parallel with one or more other acts of the process 900. Moreover, the process 900 may include first through third blocks 902, 904, and 906, respectively, shown in column form. The first block 902 illustrates inputs into the energy analysis system. The second block 904 includes acts performed by the RME operating in accordance with embodiments of the present system. IN accordance with embodiments of the present system, the third block 906 represents outputs of the RME. Illustratively, the process 900 may start at act 903.

The process 900 may include three main acts each of which may include one or more subacts. For example, the process 900 may include input acts of the first block 902, risk management decision acts performed by the RME of the second block 904, and output acts of the third block 906.

With regard to the input acts 902, information obtained during the input acts may be obtained using any suitable method such as hierarchical input methods as discussed elsewhere in this application, direct user inputs, and/or may be retrieved from a memory of the system. Further, the process may generate and/or render a user interface (UI) which may include one or more menus with which a user may interact to enter desired information. Generally, in accordance with some embodiments, acts 903-915 may be performed as follows: act 903 may be performed to obtain information related to building type (e.g., hospital, etc.), geographic location of the building, the orientation of the building, the shape of the building, the size of the building, the size and orientation of the windows, roof structure of the building, the HVAC system, etc. Act 905 may be performed to obtain information related to weather condition, use pattern variations and/or energy prices, etc. Acts 907 and 909 may be performed to obtain retrofit variables under consideration (e.g., installed lighting types, thermostat setpoint schedules, lighting controls), which are the variables to be optimized over (e.g., minimize electricity and natural gas consumption), and the fixed/promised return of the retrofit project (e.g., energy cost savings, return on investment, etc.). Acts 911 and 913 may be performed to obtain information related to expected return and risk tolerance levels for financial, environmental and other measures. Act 915 may be performed to obtain information related to existing knowledge about energy prices, material costs, technology efficiency levels, weather forecasts. These acts will be discussed below in further detail.

During act 903 the process may obtain information related to a building such as building property information (BPI). The BPI may include information related to building type, energy consumption, pollution emission levels, occupant comfort levels and/or other building performance metrics and may be obtained as attribute information (AI) which may be entered by a user and/or obtained from a memory of the system. In some embodiments, the AI may include default information such as based on an identified building type. If desired, the AI may be obtained as discussed elsewhere in this application. Moreover, the BPI may include information related to the building such as a geographic location of the building, an orientation of the building, a shape of the building (e.g., square, round, oval, rectangular, flat roof, A-frame, etc.), the size of the building (e.g., in meters$^2$), size of windows (e.g., in meters$^2$) of the building, and orientation of the windows (e.g., facing north, south, east, west, etc.), roof structure of the building (e.g., flat, gable, insulated, un-insulated, etc.), heating ventilation and air conditioning (HVAC) parameters and type, and/or other characteristics of the building. Further, the information related to the BPI may include information such as energy consumption, pollution emission levels, occupant comfort levels and/or other building performance metrics for the building. Generally, the BPI may be considered deterministic information.

During act 905, the process may obtain information related to uncertainty information (UI) such as weather information, use pattern information (e.g., occupancy information), energy price information and/or other information uncertainty variables. The system and/or user may decide which of the weather information, the use pattern information, the energy price information and/or the other uncertainty variables to acquire. Moreover, one or more of the weather information, the use pattern information, the energy price information and/or the other uncertainty variables may be weighted so that an importance may be adjusted relative to other of the weather information, the use pattern information, the energy price information and/or the other uncertainty variables.

With regard to the weather information, the process may model future (e.g., predicted) weather patterns (e.g., to capture uncertainty in future weather conditions) using any suitable method. For example, the process may obtain actual weather information for a period of time (e.g., a past time period) and use this information to model (e.g., predict) future weather. Accordingly, the process may obtain actual weather information which, for example, may include (e.g., hourly, etc.) weather information of an area corresponding to a particular location of the building for the time period. This weather information may include (e.g., hourly) information related to, for example, temperature, daylight, humidity, wind speed, etc., collected over the time period. The time period may be set by the system and/or user to any value (e.g., 1 day, 1 month, 1 year, 10 years, etc.).

Then, to model future weather patterns, the process may randomly generate weather information for a number of time periods (e.g., thirty days in the current example) in which hourly temperature readings are generated in based upon the actual weather information and random information (e.g., random values) generated by the process. For example, each of the predicted (hourly) temperatures is generated by an independent normal variable centered around a typical hourly reading with standard deviation of 3 degrees. The value 3 is selected based on empirical studies. However, the standard deviation may include other values, if desired.

Further, with regard to the use pattern information (e.g., occupancy information), this information may provide information relevant to determine heat generated such as by building occupants, lighting use, etc. and comfort based for example on thermostat settings during occupancy demanded by the occupants of the building. The comfort demanded by occupants in the building may be represented as a percentage of occupants who are comfortable with a certain interior climate (e.g., temperature, humidity, etc.) such as 75% of the occupants.

Figure 10:
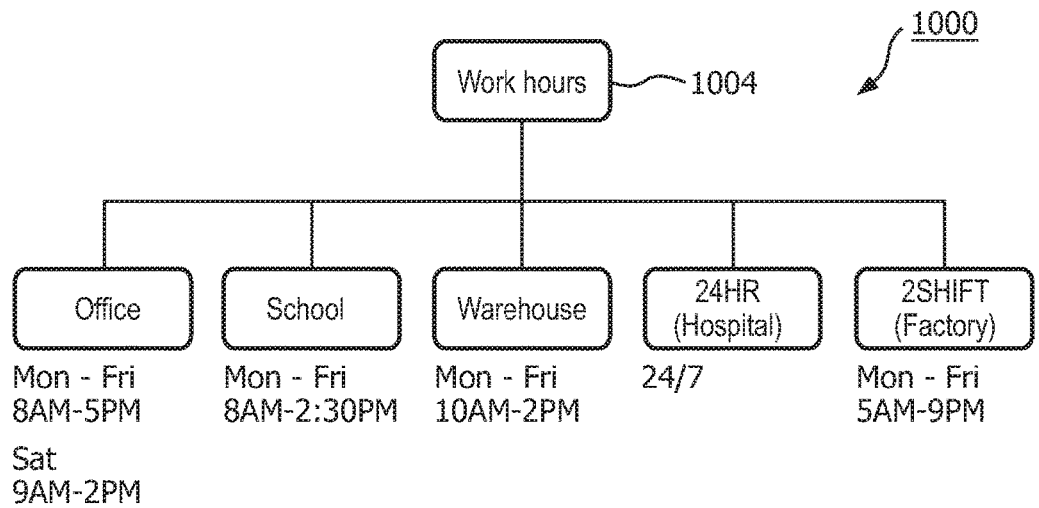
FIG. 10 shows a graph illustrating use patterns for five different categories of buildings in accordance with embodiments of the present system.

Further, the use pattern may be based upon the building's category (e.g., type). For example, FIG. 10 shows a graph 1000 illustrating use patterns and corresponding use pattern information for five different categories of buildings in accordance with embodiments of the present system. For example, with respect to an office category, the work hours (e.g., use patterns) are Mon-Fri 8:00 am to 5:00 pm and Sat 9:00 am to 2:00 pm. Referring to graph 1000, illustrative hourly use schedules for five categories of buildings are shown. These categories include an office, a school, a hospital, a warehouse and a two-shift factory. However, in other embodiments, other categories and/or hours may be used. Embodiments of the present system may include an application to simulate energy use of a building using a tool such as a simulation tool known as EnergyPlus™ and which is discussed below in further detail. The EnergyPlus™ application may include detailed simulation features for occupancy of a building for any day, date, time. Accordingly, the EnergyPlus™ application may track a schedule of the building by day, date, time, etc. Further, the EnergyPlus™ application may keep track of holidays for a particular year so a more refined simulation may be provided.

Referring back to FIG. 9, during act 907, the process may obtain information related to contract information. The contract information may include information which may characterize one or more of the retrofit variables (as will be discussed with regard to act 909 below) under consideration which are the variables to be optimized over, and the fixed/promised return of the retrofit project. The contract information may further include (reward/penalty) terms regarding the uncertain factors which might affect the return.

Figure 11:
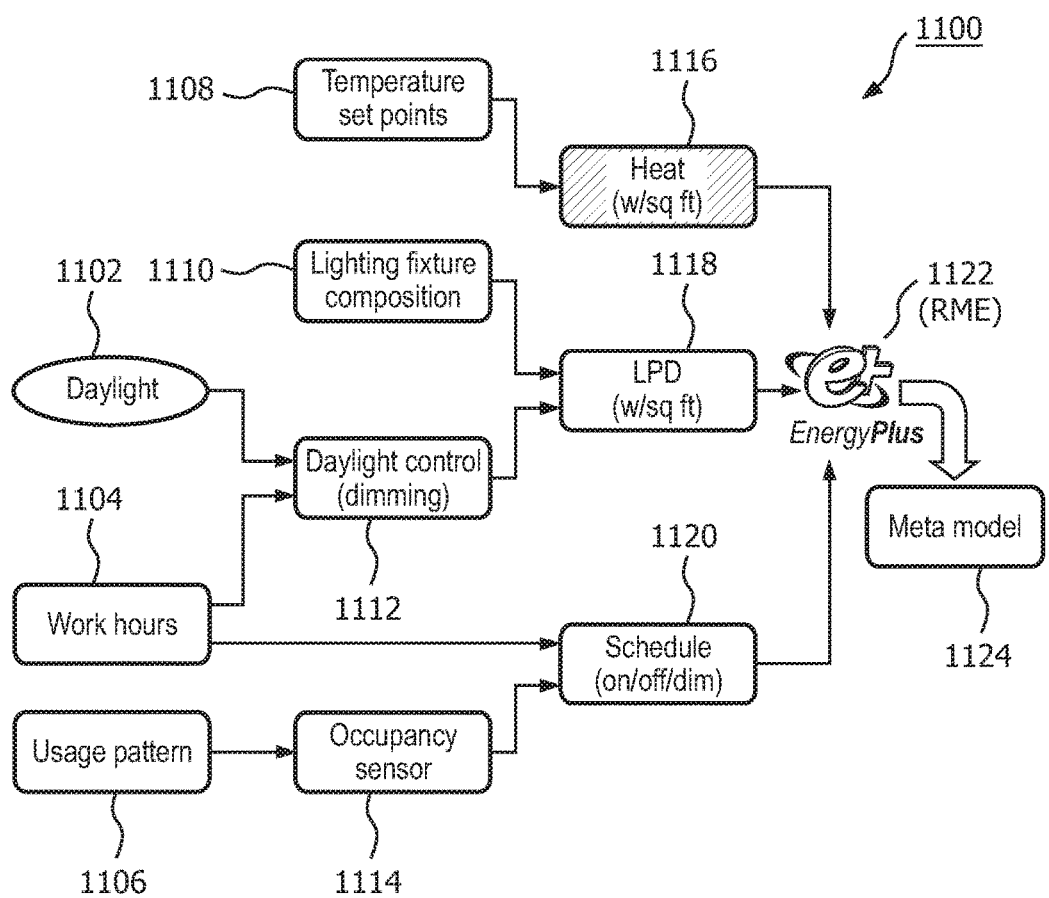
FIG. 11 shows a graph of retrofit variables to a risk management engine (RME) operating in accordance with embodiments of the present system.

During act 909, the process may obtain information related to the retrofit variables and determine information such as heat information (e.g., see, FIG. 11, element 1116), lighting power density (LPD) information (see, FIG. 11, element 1118), and schedule information (see, FIG. 11, element 1120). The information related to the retrofit variables are illustratively shown in FIG. 11 as a graph of retrofit variables to be processed to obtain information to be input by an RME 1122 operating in accordance with embodiments of the present system. Although exemplary retrofit variables are shown and described, it is envisioned that other retrofit variables may also be provided and/or used by the process, if desired.

Referring to FIG. 11, retrofit variables may include information such as hours of daylight 1102, such as may be provided by daylight sensors, schedules of sunrise/sunset, etc., may be utilized together with building work hours 1104 to determine a daylight control profile 1112 (e.g., light dimming control). Building usage patterns 1106 may be manually input and/or may be provided by occupancy sensors 1114 and may be utilized together with the work hours 1104 for determining a lighting schedule of the building 1120 (e.g., a lighting schedule of on/off/dimming for building lighting). Temperature set points 1108 may be utilized to determine heating requirements 1116 such as in watts per square foot. Lighting fixture composition 1110, and the daylight control (dimming) profile 1112 may be utilized to determine the lighting power density (LPD) information 1118 using any suitable method such as using a simulation software such as SPOT™ (Sensor Placement+ Optimization Tool) and/or CalcZone™. Thereafter, the heat information 1116, the LPD information 1118, and the schedule information 1120 may be input into the RME 1122 for further processing to produce a meta model 1124 which may include information related to recommended retrofit variables. In accordance with embodiments of the present system, the meta model may, for example, describe electricity consumption as a function of LPD and control options, or electricity and natural gas consumption as a function of heating and cooling setpoints. However, in yet other embodiments, other meta models may be defined by, for example, the system and/or user.

Referring back to FIG. 9, during act 911, the process may obtain information related to provider goal(s). The information related to provider goals may be specified both in terms of expected return and risk tolerance levels for financial, environmental and other measures. For example, the provider goals may be to deliver a project with 20-30% profit margin with 75-90% certainty. During act 913, the process may obtain information related to client goal(s) (e.g. to realize 20-30% return on investment with 80% certainty). The information related to client goals may be specified both in terms of expected return and risk tolerance levels for financial, environmental and other measures.

Information obtained and/or generated during any of the acts of the process 900 may be stored in a memory of the system for later use as historical information in, for example, a historical data database 915. The historical data may include information related to existing knowledge (e.g., deterministic information) energy prices, material costs, technology efficiency levels (e.g., lighting efficiency, air conditioning efficiency, weather forecasts, status of other projects, etc.

With regard to the risk management decision acts 904 to be performed by the RME, the RME may map information input during one or more of the input acts 902 to the information output during the output acts 904. Acts performed by the RME may begin during act 917 and may include risk management decision acts.

During act 917, the RME may identify information related to one or more of the retrofit variables 909 and determine a quantization level of these variables. For example, in accordance with some embodiments, a retrofit variable may be explored over a continuously variable range (e.g. LPD 0.5 to 1.0 W/SF), to constrain the optimization problem to a reasonable computational load, LPD may be quantized to 0.5 W/SF, 0.8 W/SF, and 1.0 W/SF. After completing act 917, the process may continue to act 919.

During act 919, the process may perform simulations and/or numerical studies with respect to retrofit variables. In accordance with some embodiments of the present system, all combinations of quantized retrofit variables may be simulated to generate data to relate output metrics (such as energy consumption) to the retrofit variables. The simulations and/or numerical studies may then yield an output of numerical values related to building metrics such as one or more of energy consumption, pollution emission levels, occupant comfort levels, etc., for the building. After completing act 919, the process may continue to act 921.

During act 921, the process may perform a machine learning act. The machine learning act may employ a learning technique to learn (e.g., generate) a model relating one or more of the retrofit variables to performance. In accordance with some embodiments of the present system, supervised learning algorithms may be used on the data generated during act 919 to construct generalized functions to map the retrofit variables to the output metrics. After completing act 921, the process may continue to act 923.

During act 923, the process may form a meta model which may include information related to recommended retrofit variables. In accordance with some embodiments of the present system, the meta model may be the model (relating performance metrics as functions of retrofit variables) resulting from the machine learning act. After completing act 923, the process may continue to act 925.

During act 925, the process may assess the meta model generated during act 921 to determine whether the model is good or bad. The process may perform this act using any suitable method. In accordance with some embodiments of the present system, historical data or data sets with known correlations between inputs and outputs may be used to test the meta model's ability to predict outputs based on inputs. Accordingly, if it is determined that the model is good, the process may continue to act 927. However, if it is determined that the model is bad, the process may repeat act 917. In accordance with some embodiments of the present system, when repeating act 917 some information may be changed. For example, a retrofit variable, such as LPD may be re-quantized from the quantization levels of the previous example (e.g., 0.5 W/SF, 0.8 W/SF, and 1.0 W/SF) to 0.5, 0.6, 0.7, 0.8, 0.9, 1.0 W/SF.

During act 927, the process may store the metal model generated during act 921 as the historical data 915 for later use. The meta model may include information such as equations relating retrofit variables to performance metrics. After completing act 927, the process may continue to act 929.

During act 929, the process may optimize the retrofit variables to optimize the meta model (e.g., the learned model). To optimize the meta model, the process may use the information related to uncertainty information (see, uncertainties obtained during act 905) to refine the meta model and for performance optimization using the refined meta model. The optimization may be performed with respect to client goals and/or provider goals, using techniques including, but not limited to, linear programming, nonlinear programming, coordinate descent algorithms and Pareto frontier characterization. The optimization may form recommended retrofit variable information as will be described below with respect to act 931 and which may include information related to expected risk and return estimations for one or more of a client and a provider. After completing act 929, the process may continue to act 931.

During act 931, the process may separate the recommended retrofit variable information into information that is related to expected risk and return estimations for the client 933 and for the provider 935, respectively. The information related to expected risk and return estimations may be related to financial, environmental and/or other building performance metrics. In accordance with some embodiments of the present system, each retrofit solution may be presented (e.g., to a user by rendering the information) showing performance metrics as probability density functions, which can then be further analyzed to provide ranges of returns for given ranges of probabilities. For example, the process may render (e.g. on a display of the client), store (e.g., in a memory), and/or transmit (e.g., to a selected address of the client such as an email address, a social networking address, etc.), this information as may be desired. After completing acts 933, 935, the process may continue to act 937 during which a portfolio optimization process may be performed to optimize the retrofit variable information with other retrofit variable information (e.g., of other buildings) obtained from the historical data 915. For example, the provider may be involved in many renovations projects simultaneously. Accordingly, by combining certain retrofit projects for a plurality of buildings together, the provider may be able to diversify and/or reduce the overall risk/costs associated with the portfolio. Therefore, it may be advantageous for the provider to optimize over the retrofit projects using the historical data 915. Further, the process may store information related to the current project (e.g., for the current building) such as the recommended retrofit information (or parts thereof) as a part of the historical data 915.

EXAMPLE

An example of a process performed by the RME 1122 will now be described with reference to FIG. 11. Acts of the RME 1122 may be performed, at least in part, by a simulation tool such as a multi-platform software application known as EnergyPlus™ (e.g., v 7-1-0) operating in accordance with embodiments of the present system. The RME 1122 may obtain information related to, for example, building properties (see, act 903), local weather (see, act 905), and retrofit variables (see, act 909) as inputs and may generate a meta model such as a metal model 1124 which may include recommendation information which may include recommended retrofit variables as an output. The recommended retrofit variables may predict future risks and returns to a client and/or a provider.

The information related to the required retrofit variables (see, act 909) may include information such as daylight hours 1102, daylight control (e.g., dimming control) profile 1112, occupancy sensors 1114, a schedule of the building (e.g., a lighting schedule e.g., on/off/dim) 1120, lighting fixture composition 1110, temperature set points, 1108, etc. The process 1100 may employ any suitable method such as by employing simulation methods performed by any suitable application such as SPOT™ and/or CalcZone™ and determine the LPD information 1118 based upon the lighting fixture composition 1110 and daylight control (dimming control) profile 1112. Then, the RME 1122 may process the heat information 1116, the LPD information 1118, and/or the schedule information 1120 as input information. Then, the RME 1122 may process the input information and output the meta model 1124 based at least in part upon the input information. The meta model 1124 may include information related to recommended retrofit variables. In accordance with some embodiments of the present system, a simulation tool may be used as part of the RME. For example, all combinations of quantized inputs may be simulated using Energy Plus to determine output data. The input and output data may then be used in the machine learning step to generate the meta model. For example, a simulation tool such as Energy Plus may be given quantized inputs to generate a simulated output and these results from Energy Plus may be used by the RME to generate the meta model.

With the above-described inputs, the EnergyPlus™ application of the RME 1122 operating in accordance with embodiments of the present system, may form one or more simulation models of the building's performance. The output from the simulation application, such as the Energy-Plus™ application, may include the meta model 1124 which may include information related to recommended retrofit variables and may provide a description of various building performance metrics predicted for a selected time period such as a year. However, in yet other embodiments, other time periods (e.g., 0.5, 1, 5, etc., years) may be selected. The meta model 1124 may further include information such as information related to hourly human occupancy information, comfort level prediction, electricity consumption (hourly, cumulative, etc.), natural gas consumption (hourly, cumulative, etc.), and emission levels. With regard to the comfort level this may be expressed as a percentage of occupants which do not find the environmental conditions (e.g., temperature, humidity, etc.) to be comfortable.

The RME 1122 may then learn from the simulated results another model that includes information which can predict future building performance under various weather conditions and retrofit variables. The RME 1122 may further take into account retrofit project present cost (e.g., which may be estimated using any suitable simulation software application such as CostWorks™), future energy price forecast (which is an uncertain variable), and may optimize these variables with respect to a certain object function over the course of a future time period such as the next 10 years. Examples include net present value for example with a discount factor 10%, while guaranteeing a certain thermal comfort level requirement, as follows, $$\min \text{NPV}(\text{Elec+Gas+installation}),$$

$$\text{subject } \mu+0.5\sigma<=25\% \text{ (PPD)}.$$

where min NPV is the minimum Net Present Value, $\mu$ is the mean variation of user satisfaction over time, $\sigma$ is the standard deviation of user satisfaction over time and PPD is the Percentage of People Dissatisfied.

The comfort level requirement may be different depending upon the application, for instance, a hospital should have a higher comfort level requirement than another building such as a warehouse. The comfort level requirement may be considered an input restraint and may be represented as a percentage of occupants of the building that will be dissatisfied with their thermal environment. For example, the above-described equation uses a 25% PPD, which means at most 25% people will be dissatisfied with their thermal environment for most of the time (mean+0.5 standard deviation captures about 70% of all time incidences). Other input constraints (e.g., objective functions) may include an expected payback period of the retrofit project, an expected internal rate of return (IRR), a variance of energy consumption, where the uncertainty comes from both the weather and the energy prices (e.g., of electricity and natural gas) and a ratio of an expected value of the building and the variance of energy consumption. Other constraints may include a reduction in emission level, carbon footprint and/or a reduction of electricity consumption.

Test Building

A medium office building with 3 stories and 15 zones was tested in Chicago, USA, in accordance with embodiments of the present system. The process obtained energy prices from an energy model forum and calculated risks and returns for a client for a future time period. The calculated risks and returns were included in a model of the building's performance generated in accordance with embodiments of the present system and included a meta model output by an RME in accordance with embodiments of the present system.

Figure 12A:
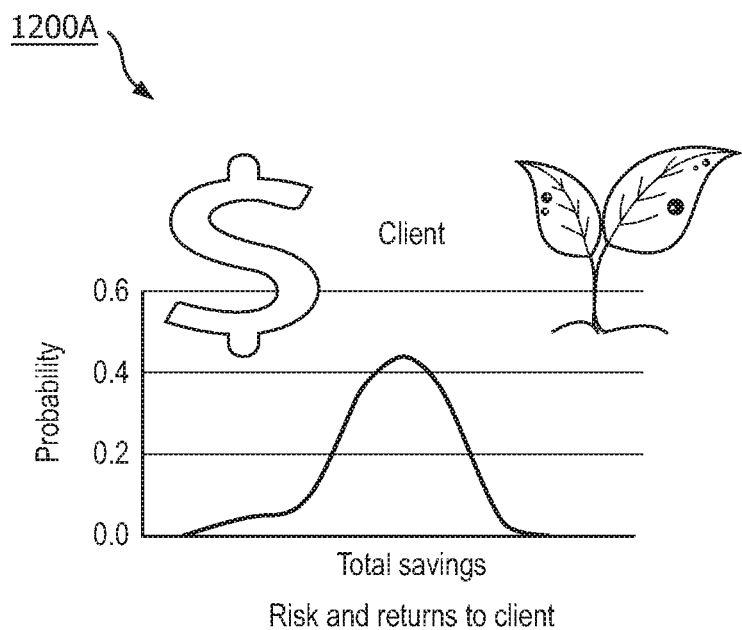
FIG. 12A shows a graph of risk factors of a client generated in accordance with embodiments of the present system.
Figure 12B:
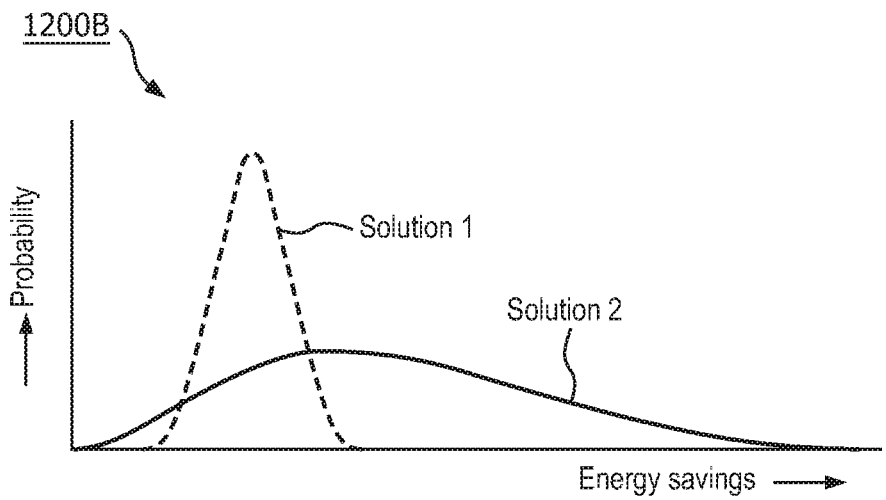
FIG. 12B shows a graph illustrating energy savings of solutions generated in accordance with embodiments of the present system.

FIG. 12A shows a graph of risk factors of a client generated in accordance with embodiments of the present system; FIG. 12B shows a graph illustrating energy savings of solutions generated in accordance with embodiments of the present system. With regard to FIG. 12A, this graph illustrates that total savings is not a single number, but a distribution represented as a probability density function. FIG. 12B illustrates a graph in which a comparison of two solution probability density functions, where solution one represents less savings but higher certainty (i.e., less risk), and solution two represents a greater range of savings (higher possible savings than solution one) but with less certainty (i.e., more risk).

Figure 13:
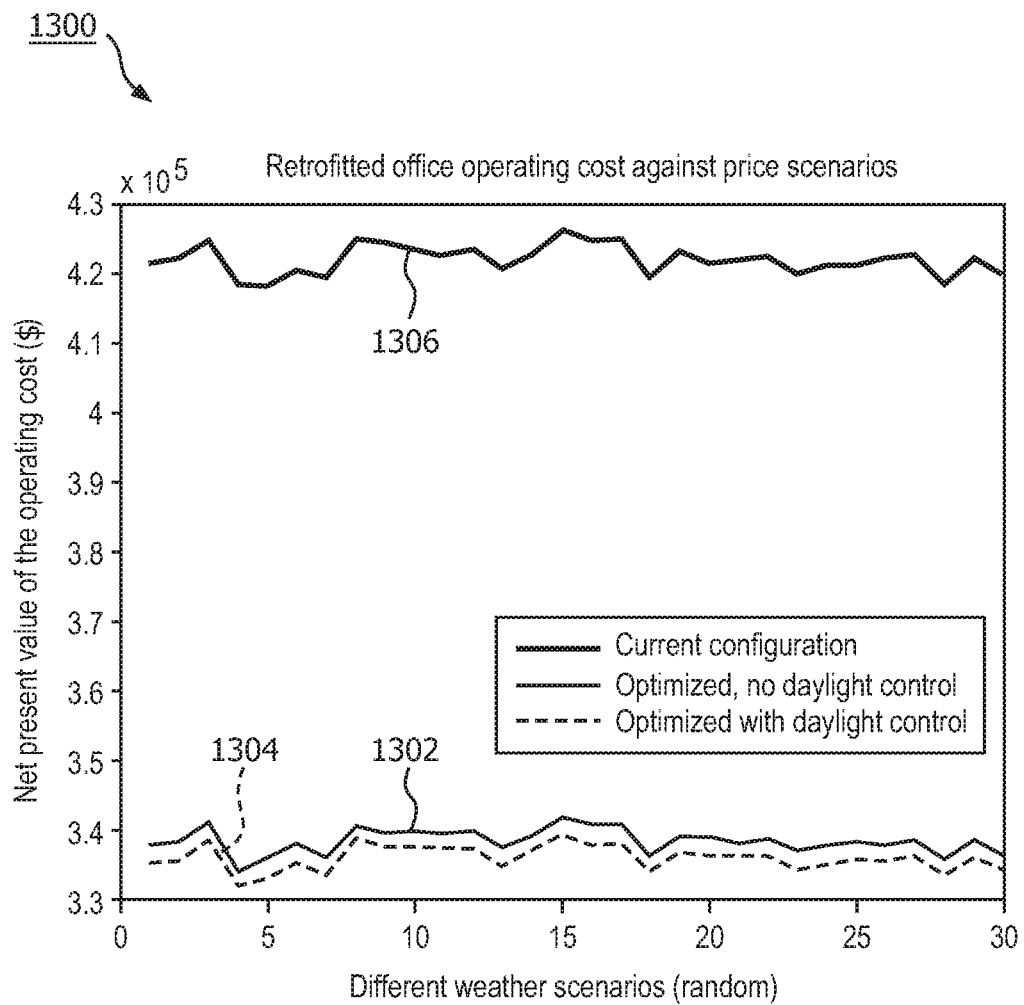
FIG. 13 shows a graph of retrofitted office operating cost against price scenarios generated in accordance with embodiments of the present system.

FIG. 13 shows a graph 1300 of retrofitted office operating cost against price scenarios generated in accordance with embodiments of the present system. Referring to graphs 1200A, 1200B, and 1300, total savings to the client together with the projected probability of how likely these savings amounts might occur is shown. Further, graph 1300 shows a significant savings is expected for an optimization of the building as compared to the current configuration of the building. More particularly, graph 1300 shows a plot of expected net present value (for operating costs) calculations for the building for 30 different (random) weather scenarios generated by the process in accordance with embodiments of the present system.

The graph 1300 was determined based upon an office schedule (e.g., for a building categorized as an office building) and shows net present value of the operating costs for first and second recommended optimal retrofit projects 1302 and 1304, respectively, (optimized without or with daylight control, respectively) versus a current configuration 1306 for the building.

The results shown in the graph 1300 show that in accordance with embodiments of the present system, clear financial incentives may be provided that are robust with respect to future weather realizations. For example, with respect to the predicted weather, in some embodiments, the process may take into account expected global warming over, for example, a 5 year window and provide expected energy costs for a building in accordance with, at least, the expected global warming. In yet other embodiments, the process may predict other costs such as gross costs, net costs, net operating income (NOI) etc., for a future time period based upon deterministic and/or stochastic risk factors.

Although financial aspects (e.g., net present value of the operating cost) of the recommended retrofit project are shown, in yet other embodiments, it is envisioned that results for environmental impact for the building based upon the same or similar inputs may be determined. For example, it is envisioned that the process may compute a building's contribution to greenhouse gases due to energy use.

Figure 14:
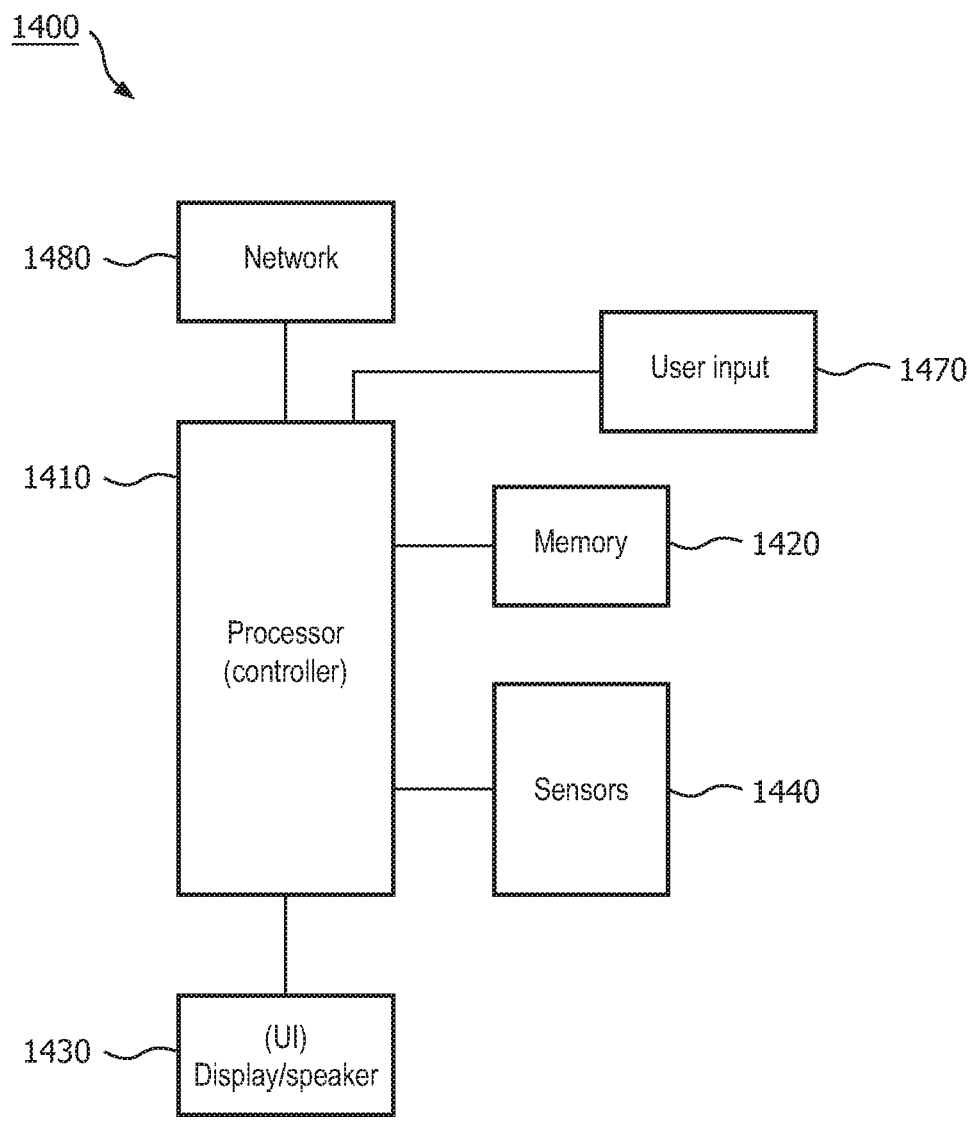
FIG. 14 shows a portion of a system in accordance with embodiments of the present system.

FIG. 14 shows a portion of a system 1400 in accordance with an embodiment of the present system. For example, a portion of the present system 1400 may include a processor 1410 (e.g., a controller) operationally coupled to a memory 1420, a user interface 1430, sensors 1440, and a user input device 1470. The memory 1420 may be any type of device for storing application data as well as other data related to the described operation. The application data and other data are received by the processor 1410 for configuring (e.g., programming) the processor 1410 to perform operation acts in accordance with the present system. The processor 1410 so configured becomes a special purpose machine particularly suited for performing in accordance with embodiments of the present system. The sensors may include, for example, occupancy sensors, sunlight sensors, humidity sensors, temperature sensors, barometric sensors, HVAC sensors, light sensors, switch status sensors (e.g., which provide information indicative of whether the switch is on, off and/or dimmed), weather sensors (e.g., temperature, humidity, barometric pressure, etc.).

The operation acts may include configuring the system 1400 by, for example, configuring the processor 1410 to obtain information from user inputs, the sensors 1440, and/or the memory 1420 and processing this information in accordance with embodiments of the present system to obtain information related to energy use and which may form at least part of information in accordance with embodiments of the present system. The user input portion 1470 may include a keyboard, a mouse, a trackball and/or other device, including touch-sensitive displays, which may be stand alone or be a part of a system, such as part of a personal computer, a notebook computer, a netbook, a tablet, a smart phone, a personal digital assistant (PDA), a mobile phone, and/or other device for communicating with the processor 1410 via any operable link. The user input portion 1470 may be operable for interacting with the processor 1410 including enabling interaction within a UI as described herein. Clearly the processor 1410, the memory 1420, the UI 1430 and/or user input device 1470 may all or partly be a portion of a computer system or other device such as a client and/or server as described herein.

Operation acts may include requesting, providing, and/or rendering of information such as, for example, information related to energy use of a building. The processor 1410 may render the information on the UI 1430 such as on a display of the system. The sensors may include suitable sensors to provide desired sensor information to the processor 1410 for further processing in accordance with embodiments of the present system.

The methods of the present system are particularly suited to be carried out by processor programmed by a computer software program, such program containing modules corresponding to one or more of the individual steps or acts described and/or envisioned by the present system.

The processor 1410 is operable for providing control signals and/or performing operations in response to input signals from the user input device 1470 as well as in response to other devices of a network and executing instructions stored in the memory 1420. For example, the processors 1410 may obtain feedback information from the sensors 1440 and may process this information to determine energy conservation information. The processor 1410 may include one or more of a microprocessor, an application-specific or general-use integrated circuit(s), a logic device, etc. Further, the processor 1410 may be a dedicated processor for performing in accordance with the present system or may be a general-purpose processor wherein only one of many functions operates for performing in accordance with the present system. The processor 1410 may operate utilizing a program portion, multiple program segments, or may be a hardware device utilizing a dedicated or multi-purpose integrated circuit.

Embodiments of the present system may be compatible with conventional sensors/loggers such as OccuSwitch™ Logger and the like and/or conventional simulation programs such as EnergyPlus™, ESP-r™, Autodesk Green Building Studio™, Integrated Environmental Solutions Virtual Environment™ and the like. The simulation programs may be configured in accordance with embodiments of the present system so as to be able to perform in accordance with one or more embodiments of the present system.

Accordingly, by locating sensors in accordance with embodiments of the present system, building energy use may be determined accurately and with sufficient granularity for any building.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

The specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

REFERENCES

References 1-5 listed below are incorporated herein by reference and are referred to using reference numerals R1 through R5, respectively, throughout the specification. For example, R1 may make reference to the first reference (e.g., ecoinsight audit tool).

1. ecoinsight audit tool: available through the Internet at ecoinsight.com.
2. N. Djuric, V. Novakovic, J. Hoist and Z. Mitrovic, "Optimization of energy consumption in buildings with hydronic heating systems considering thermal comfort by use of computer-based tools", Energy and Buildings, 39, pp 471-477 (2007).
3. M. Deru, E. Kozubal and P. Norton, "Walmart Experimental Store Performance Stories", NREL/CP-550-48295, ACEEE Summer Study (2010).

4. B. Eisenhower, Z. O'Neill, S. Narayanan, V. A. Fonoberov and I. Mezic, "A methodology for meta-model based optimization in building energy models", Energy and Buildings, 47, pp 292-301 (2012).
5. S. Petersen and S. Svendsen, "Method for component-based economical optimisation for use in design of new low-energy buildings", Renewable Energy, 38, pp 173-180 (2012).

The invention claimed is:

1. An energy audit system for use in retrofitting energy consuming devices in an energy consuming space, comprising:
   at least one controller configured to:
      obtain attribute information (AI) for the energy consuming devices, the AI comprising information related to a plurality of attributes and corresponding attribute choice information for each of the plurality of attributes;
      determine dependencies between each of the plurality of attributes to each determine a dependency score for each of the plurality of attributes based on the determined dependencies;
      determine a ranking of each of the attributes based upon the dependency score of each of the attributes;
      select a subset of the plurality of attributes based on the ranking;
      determine an optimized workflow based upon the subset of the plurality of attributes; and
      in accordance with the optimized workflow, render a user interface (UI) for use in retrofitting at least one of the devices to thereby obtain energy savings;
   wherein said retrofitting comprises at least one of replacing a lighting fixture and replacing a lighting control device.

2. The system of claim 1, wherein the controller further is configured to obtain attribute choice information selected by a user and which corresponds to at least one of the subset of the plurality of attributes.

3. The system of claim 1, wherein the controller is configured to determine the dependencies of each of the plurality of attributes to each other of the plurality of attributes by constructing a dependency matrix.

4. The system of claim 1, wherein the controller is configured to compare the dependency score of the plurality of attributes to a threshold value, wherein the subset of the plurality of attributes is selected as ones of the plurality of attributes with a dependency score that meets or exceeds the threshold value.

5. The system of claim 4, wherein the controller is configured to automatically populate attribute choice information corresponding to at least one of the subset of the plurality of attributes that is determined to be a dependent attribute.

6. A method of generating an energy audit for use in retrofitting energy consuming devices in an energy consuming space, the method performed by at least one controller and comprising acts of:
   obtaining attribute information (AI) for the energy consuming devices, the AI comprising information related to a plurality of attributes and corresponding attribute choice information for each of the plurality of attributes;
   determining dependencies between each of the plurality of attributes to each other;
   determining a dependency score for each of the plurality of attributes based on the determined dependencies;
   determining a ranking of each of the attributes based upon the dependency score of each of the attributes;
   selecting a subset of the plurality of attributes based on the ranking;
   determining an optimized workflow based upon the subset of the plurality of attributes; and
   in accordance with the optimized workflow, rendering a user interface (UI) for use in retrofitting at least one of the devices to thereby obtain energy savings;
   wherein said retrofitting comprises at least one of replacing a lighting fixture and replacing a lighting control device.

7. The method of claim 6, further comprising an act of obtaining attribute choice information selected by a user and which corresponds to at least one of the subset of the plurality of attributes.

8. The method of claim 6, further comprising an act of determining the dependencies of each of the plurality of attributes to each other of the plurality of attributes by constructing a dependency matrix.

9. The method of claim 6, further comprising an act of comparing the dependency score of the plurality of attributes to a threshold value, wherein the act of selecting the subset of the plurality of attributes comprises an act of selecting ones of the plurality of attributes with a dependency score that meets or exceeds the threshold value.

10. The method of claim 9, farther comprising an act of automatically populating attribute choice information corresponding to at least one of the subset of the plurality of attributes that is determined to be a dependent attribute.

11. A computer program stored on a non-transitory computer readable memory medium, the computer program configured to generate information indicative of an energy audit for use in retrofitting energy consuming devices in an energy consuming space, the computer program comprising:
   a program portion configured to:
      obtain attribute information (AI) for the energy consuming devices, the AI comprising information related to a plurality of attributes and corresponding attribute choice information for each of the plurality of attributes;
      determine dependencies between each of the plurality of attributes to each other;
      determine a dependency score for each of the plurality of attributes based on the determined dependencies;
      determine a ranking of each of the attributes based upon a dependency score of each of the attributes;
      select a subset of the plurality of attributes based on the ranking;
      determine an optimized workflow based upon the subset of the plurality of attributes; and
      in accordance with the optimized workflow, render a user interface (UI) on a display of the system for use in retrofitting at least one of the devices to thereby
      obtain energy savings;
   wherein said retrofitting comprises at least one of replacing a lighting fixture and replacing a lighting control device.

* * * * *